United States Patent
Lee et al.

(10) Patent No.: US 9,798,190 B2
(45) Date of Patent: Oct. 24, 2017

(54) PHOTO-ALIGNMENT LAYER AND LIQUID CRYSTAL DISPLAY

(71) Applicant: Samsung Display Co., Ltd., Yongin-si (KR)

(72) Inventors: Jun Woo Lee, Seongnam-si (KR); Suk Hoon Kang, Seoul (KR); Jin-Soo Jung, Hwaseong-si (KR); Baek Kyun Jeon, Yongin-si (KR); Jong Hwan Jeon, Gwangju-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 91 days.

(21) Appl. No.: 14/872,660

(22) Filed: Oct. 1, 2015

(65) Prior Publication Data
US 2016/0195777 A1    Jul. 7, 2016

(30) Foreign Application Priority Data

Jan. 7, 2015   (KR) .................. 10-2015-0002202

(51) Int. Cl.
*C09K 19/00*   (2006.01)
*G02F 1/1337*   (2006.01)
(Continued)

(52) U.S. Cl.
CPC ... *G02F 1/133723* (2013.01); *C08G 73/1014* (2013.01); *C08G 73/1017* (2013.01);
(Continued)

(58) Field of Classification Search
CPC .............. C08G 73/101; C08G 73/1014; C08G 73/1017; C08G 73/1046; C08G 73/1042;
(Continued)

(56) References Cited

U.S. PATENT DOCUMENTS

| 5,807,961 A | 9/1998 | Sawai et al. |
| 6,063,829 A | 5/2000 | Endou et al. |

(Continued)

FOREIGN PATENT DOCUMENTS

| JP | 2006-301547 | 11/2006 |
| JP | 2010-242491 | 10/2010 |

(Continued)

OTHER PUBLICATIONS

European Search Report dated May 3, 2016 in European Patent Application No. 15201548.3.

*Primary Examiner* — Ruiyun Zhang
(74) *Attorney, Agent, or Firm* — H.C. Park & Associates, PLC

(57) ABSTRACT

A liquid crystal display including a first substrate, a thin film transistor disposed on the first substrate, a first electrode connected to the thin film transistor, and a first alignment layer disposed on the first electrode, wherein the first alignment layer includes polyimide and a capping group connected to a main chain end of the polyimide, and the capping group contains at least one of a first compound represented by the following Chemical Formula 1, and a second compound represented by the following Chemical Formula 2:

(Chemical Formula 1)

(Continued)

-continued (Chemical Formula 2)

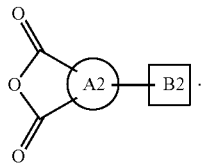

A1 and A2 are, independently of each other, an aromatic compound having 4 to 20 carbon atoms or an aliphatic cyclic compound having 4 to 20 carbon atoms; and B1 and B2 are, independently of each other, a crosslinking reaction group containing an alkylene group ($-C_nH_{2n}-$, n is a natural number).

23 Claims, 8 Drawing Sheets

(51) Int. Cl.
    *C08G 73/10* (2006.01)
    *C09K 19/56* (2006.01)
    *C09D 179/08* (2006.01)
    *G02F 1/1343* (2006.01)

(52) U.S. Cl.
    CPC ..... *C08G 73/1042* (2013.01); *C08G 73/1078* (2013.01); *C09D 179/08* (2013.01); *C09K 19/56* (2013.01); *G02F 1/133788* (2013.01); *G02F 2001/134372* (2013.01); *Y10T 428/10* (2015.01); *Y10T 428/1005* (2015.01); *Y10T 428/1023* (2015.01)

(58) Field of Classification Search
    CPC ........... C08G 73/1078; G02F 1/133723; G02F 1/13378; G02F 1/133788; G02F 1/133711; G02F 1/136227; G02F 1/134309; C09K 19/56; Y10T 428/10; Y10T 428/1005; Y10T 428/1018; Y10T 428/1023
    USPC ........ 428/1.1, 1.2, 1.25, 1.26; 349/123, 130, 349/132; 525/426; 524/600, 602; 528/310, 353
See application file for complete search history.

(56) References Cited

U.S. PATENT DOCUMENTS

| | | | |
|---|---|---|---|
| 7,615,260 B2 | 11/2009 | Yoneya et al. | |
| 2008/0117371 A1* | 5/2008 | Shin | C08L 79/08 349/127 |
| 2012/0196054 A1* | 8/2012 | Lee | G02F 1/133788 428/1.26 |
| 2014/0066590 A1 | 3/2014 | Suzuki et al. | |

FOREIGN PATENT DOCUMENTS

| | | |
|---|---|---|
| JP | 2013-120207 | 6/2013 |
| KR | 10-2005-0078720 | 8/2005 |
| KR | 10-2010-0085068 | 7/2010 |
| KR | 10-2011-0109840 | 10/2011 |
| WO | 2014136951 | 9/2014 |

* cited by examiner

PHOTO-ALIGNMENT LAYER AND LIQUID CRYSTAL DISPLAY

CROSS-REFERENCE TO RELATED APPLICATION

This application claims priority from and the benefit of Korean Patent Application No. 10-2015-0002202, filed on Jan. 7, 2015, which is hereby incorporated by reference for all purposes as if fully set forth herein.

BACKGROUND

Field

Exemplary embodiments relate to a photo-alignment layer, and a liquid crystal display.

Discussion of the Background

In order for a liquid crystal element to display an image, the liquid crystal should be aligned in a certain direction with respect to the transparent conductive electrode. Uniformity of the liquid crystal alignment is the most important factor in determining the image quality of a liquid crystal display.

A general method of aligning the liquid crystal includes a rubbing method wherein a polymer film, such as polyimide, is applied on a substrate, such as a glass, and the applied surface is rubbed in a certain direction with a fiber, such as nylon or polyester. However, the rubbing method may generate fine dust or static electricity when the fiber and polymer film are fractionized, which may cause serious problems when manufacturing a liquid crystal panel.

In order to solve the problem, a photo-alignment method wherein anisotropy is induced in a polymer film by light irradiation, which is used for aligning the liquid crystal, has been recently researched.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a photo-alignment layer and a liquid crystal display.

Additional aspects will be set forth in the detailed description which follows, and, in part, will be apparent from the disclosure, or may be learned by practice of the inventive concept.

An exemplary embodiment discloses a photo-alignment layer including: a polyimide and a capping group connected to a main chain end of the polyimide, wherein the capping group may contain a first compound represented by following Chemical Formula 1, and a second compound represented by Chemical Formula 2:

(Chemical Formula 1)

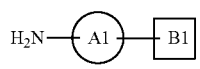

(Chemical Formula 2)

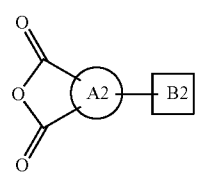

wherein A1 and A2 are, independently of each other, an aromatic compound having 4 to 20 carbon atoms or an aliphatic cyclic compound having 4 to 20 carbon atoms; and B1 and B2 are, independently of each other, a crosslinking reaction group containing an alkylene group ($-C_nH_{2n}-$, n is a natural number).

In the Chemical Formulas 1 and 2, the crosslinking reaction group may contain at least one of a third compound represented by following Chemical Formula 3, a fourth compound represented by following Chemical Formula 4; and a fifth compound represented by following Chemical Formula 5:

(Chemical Formula 3)

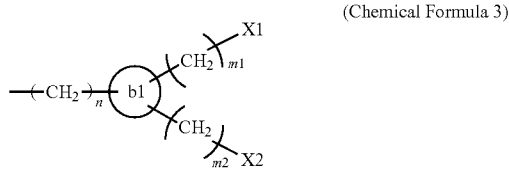

(Chemical Formula 4)

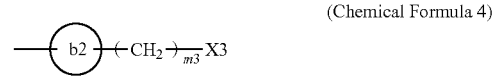

(Chemical Formula 5)

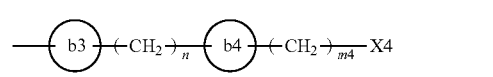

wherein n is a natural number of 3 to 11; m1 to m4 are, independently of each other, a natural number of 1 to 4; b1 is

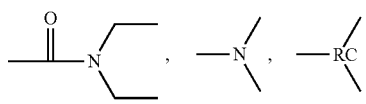

(wherein R is H or an alkyl group having 1 to 3 carbon atoms), an aromatic compound having 6 to 30 carbon atoms, or an aliphatic cyclic compound having 4 to 20 carbon atoms; b2 to b4 are, independently of one another, a single bond, $-CH_2-$, $-COO-$, $-OCO-$, $-S-$, $-O-$, $-CH_2CH_2O-$, $-OCH_2CH_2-$, an aromatic compound having 6 to 30 carbon atoms, or an aliphatic cyclic compound having 4 to 20 carbon atoms; and X1 to X4, independently of one another, include $-OH$, $-NH_2$, an acrylate group, a methacrylate group, a vinyl group or

The crosslinking reaction group in the Chemical Formulas 1 and 2 may include a third compound represented by following Chemical Formula 3-1:

(Chemical Formula 3-1)

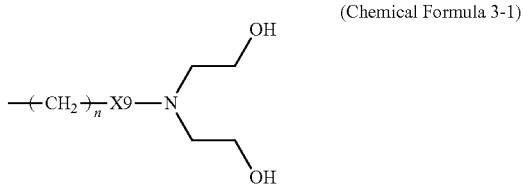

wherein n is a natural number of 3 to 11; X9 is
—$(CH_2)_m$—O—, —O—$(CH_2)_m$—, —$(CH_2)_m$—S—,
—S—$(CH_2)_m$— (wherein m is a natural number of 1 to
10),

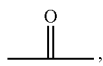

an aromatic compound having 6 to 30 carbon atoms, or an aliphatic cyclic compound having 4 to 20 carbon atoms.

The polyimide may contain a repeating unit of a seventh compound represented by following Chemical Formula 7:

(Chemical Formula 7)

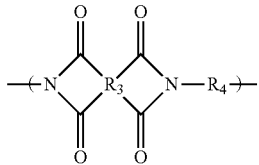

wherein R3 is a tetravalent organic group derived from aliphatic cyclic acid dianhydride or aromatic acid dianhydride; and R4 is a divalent organic group derived from aromatic diamine.

The capping group connected to a main chain end of the polyimide may be represented by following Structural Formulas 1 or 2:

(Structural Formula 1)

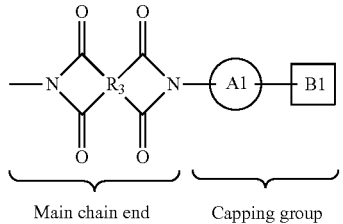

Main chain end    Capping group (Structural Formula 2)

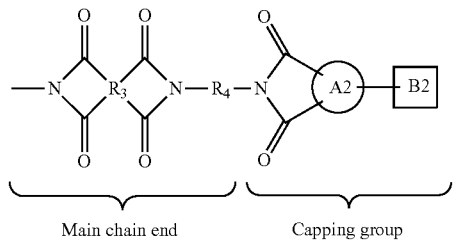

Main chain end    Capping group wherein R3 is a tetravalent organic group derived from an aliphatic cyclic acid dianhydride or an aromatic acid dianhydride; R4 is a divalent organic group derived from an aromatic diamine; A1 and A2 are, independently of each other, an aromatic compound having 4 to 20 carbon atoms, or an aliphatic cyclic compound having 4 to 20 carbon atoms; and B1 and B2 are, independently of each other, a crosslinking reaction group containing an alkylene group (—$C_nH_{2n}$—, n is a natural number).

The polyimide may be a copolymer of (a) at least one of a cyclobutanedianhydride (CBDA) and cyclobutanedianhydride (CBDA) derivatives, and (b) a first diamine.

The first diamine may contain an eighth compound represented by following Chemical Formula 8:

(Chemical Formula 8)

$H_2N$—⟨ ⟩—X—⟨ ⟩—$NH_2$ wherein X is —$(CH_2)_h$—, —S—$(CH_2)_h$—S—, —O—$(CH_2)_h$—O—,

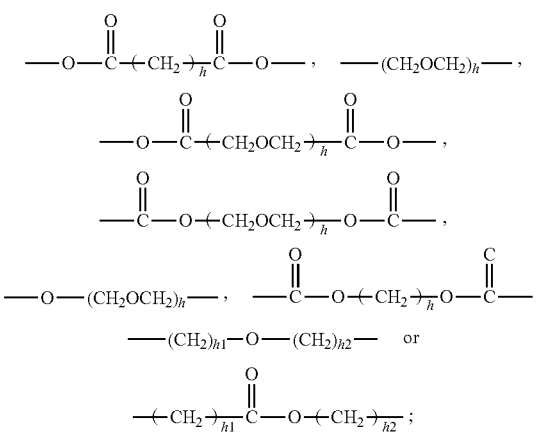

h is a natural number of 1 to 10; and h1 and h2 are, independently of each other, a combination of natural numbers selected so that the sum of carbon atoms of an alkylene group of X is 2 to 10.

The copolymer may further contain a polymer of (a) at least one of a cyclobutanedianhydride (CBDA) and a cyclobutanedianhydride (CBDA) derivative, and (b) a second diamine.

The copolymer may include at least one of repeating units represented by following Chemical Formulas 11 and 12:

(Chemical Formula 11)

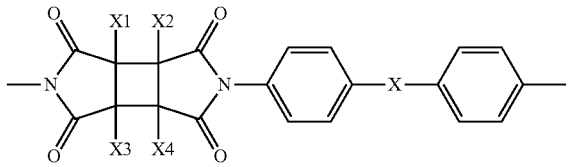

(Chemical Formula 12)

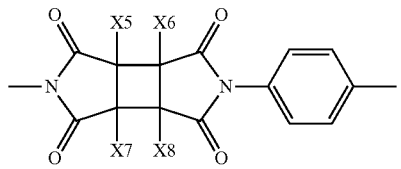

wherein X is —(CH$_2$)$_h$—, —S—(CH$_2$)$_h$—S—, —O—(CH$_2$)$_h$—O—,

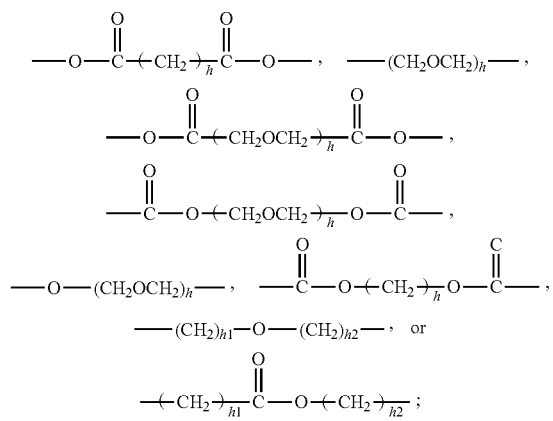

h is a natural number of 1 to 10; h1 and h2 are, independently of each other, a natural number selected so that the sum of carbon atoms of an alkylene group of X is 2 to 10; and X1 to X8 are, independently of one another, hydrogen, halogen, an unsubstituted or substituted alkyl group, an unsubstituted or substituted aryl group, or an unsubstituted or substituted heteroaryl group.

The copolymer may contain a compound represented by following Chemical Formula 13:

Chemical Formula 13

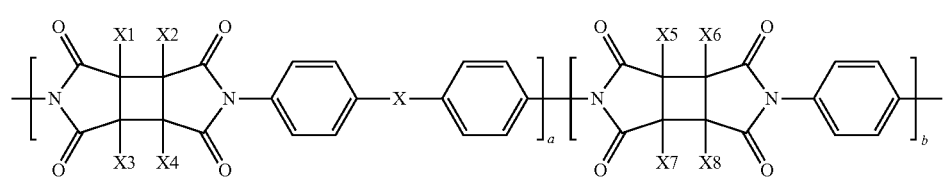

wherein X is —(CH$_2$)$_h$—, —S—(CH$_2$)$_h$—S—, —O—(CH$_2$)$_h$—O—,

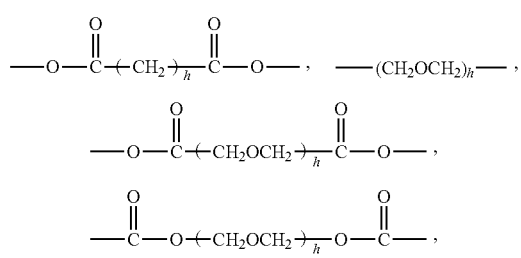

h is a natural number of 1 to 10; h1 and h2 are, independently of each other, a natural number selected so that the sum of carbon atoms of an alkylene group of X is 2 to 10; a:b is 20:80 to 50:50; and X1 to X8 are, independently of each other, hydrogen, halogen, an unsubstituted or substituted alkyl group, an unsubstituted or substituted aryl group, or an unsubstituted or substituted heteroaryl group.

An exemplary embodiment discloses a liquid crystal display including: a first substrate, a thin film transistor disposed on the first substrate, a first electrode connected to the thin film transistor, and a first alignment layer disposed on the first electrode, wherein the first alignment layer contains a polyimide and a capping group connected to a main chain end of the polyimide, and the capping group having at least one of a first compound represented by following Chemical Formula 1 and a second compound represented by following Chemical Formula 2:

(Chemical Formula 1)

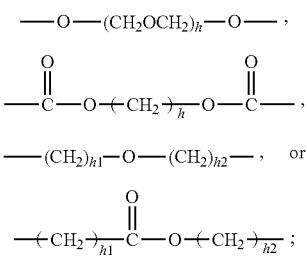

(Chemical Formula 2)

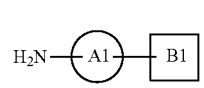

wherein A1 and A2 are, independently of each other, an aromatic compound having 4 to 20 carbon atoms or an aliphatic cyclic compound having 4 to 20 carbon atoms; and B1 and B2 are, independently of each other, a crosslinking reaction group containing an alkylene group (—$C_nH_{2n}$—, n is a natural number).

In the Chemical Formulas 1 and 2, the crosslinking reaction group may contain one of a third compound represented by following Chemical Formula 3, a fourth compound represented by following Chemical Formula 4, and a fifth compound represented by following Chemical Formula 5:

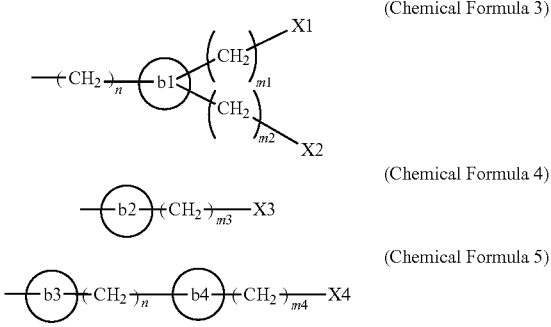
(Chemical Formula 3)

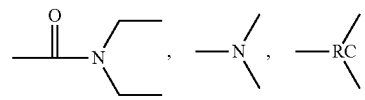
(Chemical Formula 4)

(Chemical Formula 5)

wherein n is a natural number of 3 to 11; m1 to m4 are, independently of each other, a natural number of 1 to 4; b1 is

(wherein R is H or an alkyl group having 1 to 3 carbon atoms), an aromatic compound having 6 to 30 carbon atoms, or an aliphatic cyclic compound having 4 to 20 carbon atoms; b2 to b4 are, independently of one another, a single bond, —$CH_2$—, —COO—, —OCO—, —S—, —O—, —$CH_2CH_2O$—, —$OCH_2CH_2$—, an aromatic compound having 6 to 30 carbon atoms, or an aliphatic cyclic compound having 4 to 20 carbon atoms; and X1 to X4, independently of one another, include —OH, —$NH_2$, an acrylate group, a methacrylate group, a vinyl group or

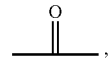

.

The crosslinking reaction group in the Chemical Formulas 1 and 2 may include a third compound represented by following Chemical Formula 3-1:

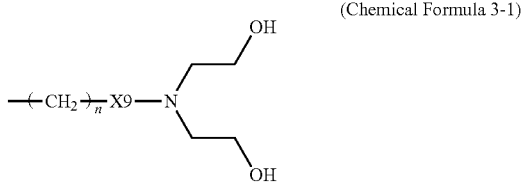
(Chemical Formula 3-1)

wherein n is a natural number of 3 to 11; X9 is —$(CH_2)_m$—O—, —O—$(CH_2)_m$—, —$(CH_2)_m$—S—, —S—$(CH_2)_m$— (wherein m is a natural number of 1 to 10),

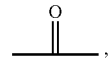
, an aromatic compound having 6 to 30 carbon atoms, or an aliphatic cyclic compound having 4 to 20 carbon atoms.

The polyimide may contain a repeating unit of a seventh compound represented by the following Chemical Formula 7:

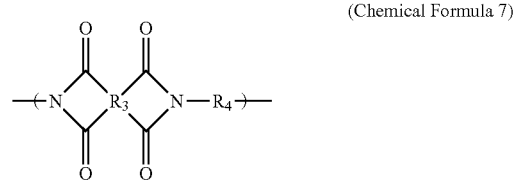
(Chemical Formula 7)

wherein R3 is a tetravalent organic group derived from an aliphatic cyclic acid dianhydride or an aromatic acid dianhydride; and R4 is a divalent organic group derived from aromatic diamine.

The capping group connected to a main chain end of the polyimide may be represented by following Structural Formulas 1 or 2:

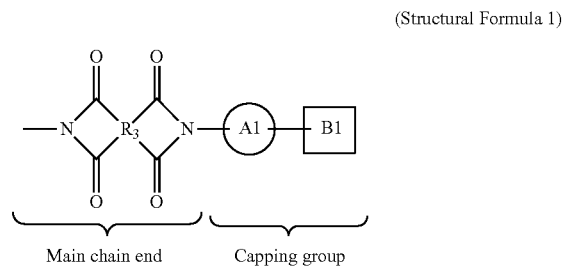
(Structural Formula 1)

Main chain end    Capping group

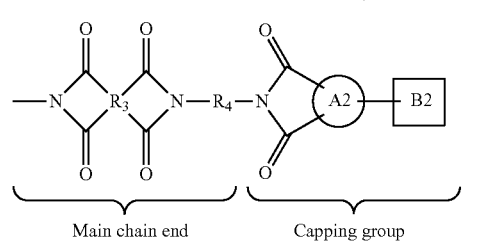
(Structural Formula 2)

Main chain end    Capping group wherein R3 is a tetravalent organic group derived from an aliphatic cyclic acid dianhydride or an aromatic acid dianhydride; R4 is a divalent organic group derived from an aromatic diamine; A1 and A2 are, independently of each other, an aromatic compound having 4 to 20 carbon atoms, or an aliphatic cyclic compound having 4 to 20 carbon atoms; and B1 and B2 are, independently of each other, a crosslinking reaction group containing an alkylene group (—$C_nH_{2n}$—, n is a natural number).

The polyimide may be a copolymer of (a) at least one of a cyclobutanedianhydride (CBDA) and a cyclobutanedianhydride (CBDA) derivatives, and (b) a first diamine.

The first diamine may contain a compound represented by following Chemical Formula 8:

(Chemical Formula 8)

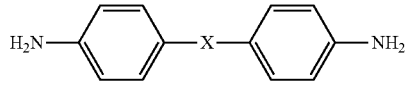

wherein X is —$(CH_2)_h$—, —S—$(CH_2)_h$—S—, —O—$(CH_2)_h$—O—, —$(CH_2OCH_2)_h$—,

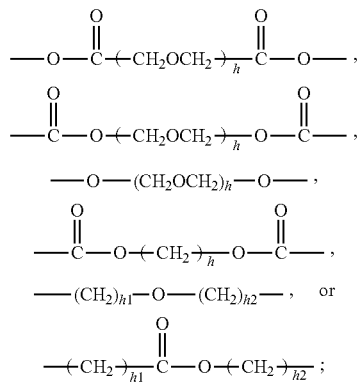

h is a natural number of 1 to 10; and h1 and h2 are, independently of each other, a natural number selected so that the sum of carbon atoms of an alkylene group of X is 2 to 10.

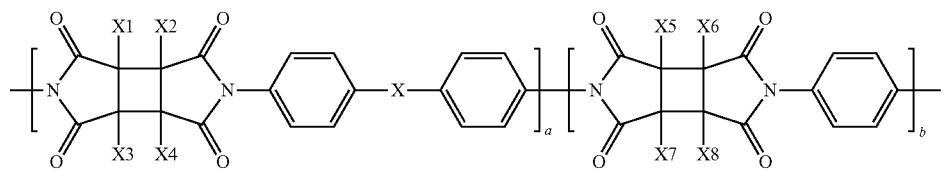

The copolymer may further include a polymer of (a) at least one of a cyclobutanedianhydride (CBDA) and a cyclobutanedianhydride (CBDA) derivative, and (b) a second diamine.

The copolymer may include at least one of repeating units represented by following Chemical Formulas 11 and 12:

(Chemical Formula 11)

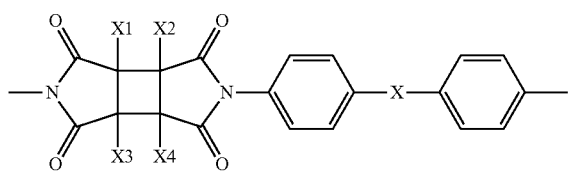

(Chemical Formula 12)

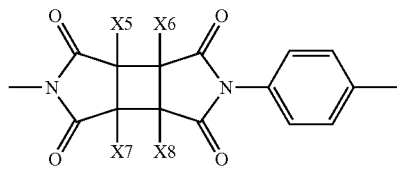

wherein X is —$(CH_2)_h$—, —S—$(CH_2)_h$—S—, —O—$(CH_2)_h$—O—,

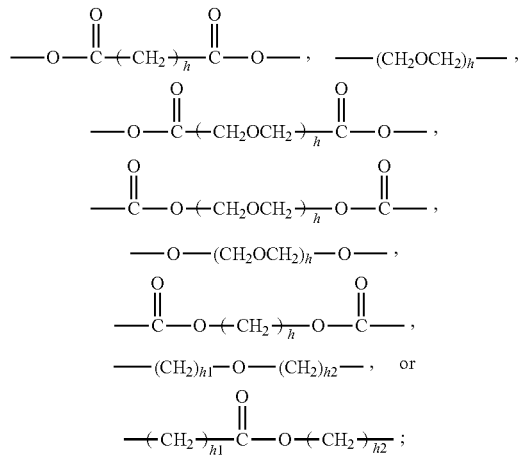

is a natural number of 1 to 10; h1 and h2 are, independently of each other, a natural number selected so that the sum of carbon atoms of an alkylene group of X is 2 to 10; and X1 to X8 are, independently of one another, hydrogen, halogen, an unsubstituted or substituted alkyl group, an unsubstituted or substituted aryl group, or an unsubstituted or substituted heteroaryl group.

The copolymer may include a compound represented by following Chemical Formula 13:

(Chemical Formula 13)

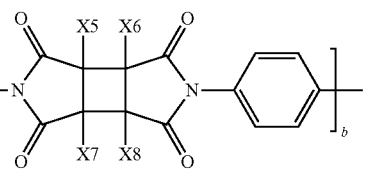

wherein X is —$(CH_2)_h$—, —S—$(CH_2)_h$—S—, —O—$(CH_2)_h$—O—,

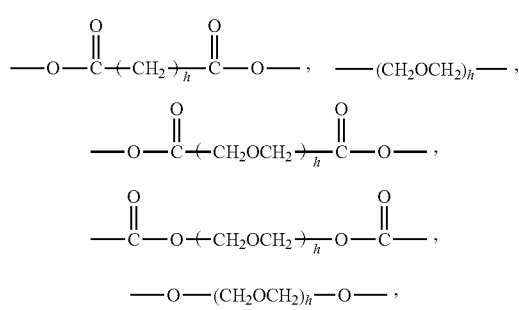

-continued $$\begin{array}{c}\mathrm{O} \quad\quad\quad\quad\quad\quad \mathrm{O} \\ \| \quad\quad\quad\quad\quad\quad \| \\ -\!\!-\mathrm{C}-\mathrm{O}-\!\!(\mathrm{CH}_2)_{\overline{h}}-\mathrm{O}-\mathrm{C}-\!\!-,\end{array}$$

$$-\!\!-(\mathrm{CH}_2)_{h1}-\mathrm{O}-(\mathrm{CH}_2)_{h2}-\!\!-, \quad \text{or}$$

$$\begin{array}{c}\mathrm{O} \\ \| \\ -\!\!(\mathrm{CH}_2)_{\overline{h1}}\mathrm{C}-\mathrm{O}-\!\!(\mathrm{CH}_2)_{\overline{h2}};\end{array}$$

h is a natural number of 1 to 10; h1 and h2 are, independently of each other, a natural number selected so that the sum of carbon atoms of an alkylene group of X is 2 to 10; a:b is 20:80 to 50:50; and X1 to X8 are, independently of each other, hydrogen, halogen, an unsubstituted or substituted alkyl group, an unsubstituted or substituted aryl group, or an unsubstituted or substituted heteroaryl group.

The liquid crystal display may further include a second electrode disposed on the substrate, wherein an insulating layer is disposed between the first electrode and the second electrode.

The first electrode may include a plurality of branch electrodes, and the second electrode may have a plate shape.

The plurality of branch electrodes may overlap the second electrode having the plate shape.

A passivation layer disposed between the thin film transistor and the second electrode may be further included, and the thin film transistor and the first electrode may be connected to each other by a contact hole through the passivation layer and the insulating layer.

A second substrate facing the first substrate, a second alignment layer disposed on the second substrate, and a liquid crystal layer disposed between the first substrate and the second substrate and containing a liquid crystal molecule may be further included, wherein the second alignment layer may be formed of the same material as the first alignment layer.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
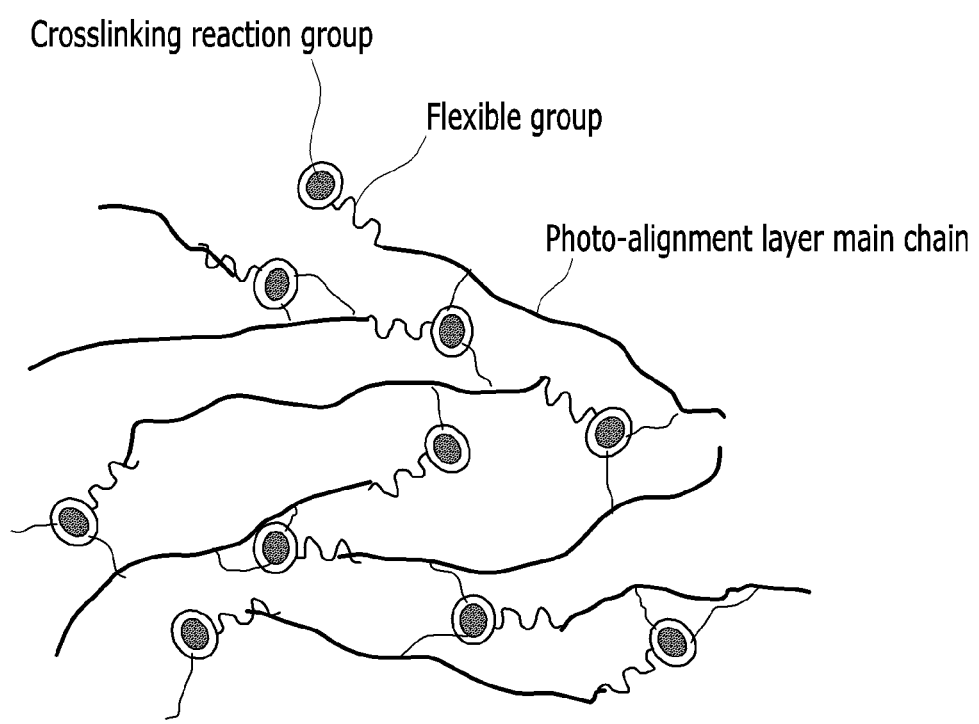
FIG. 1 is a drawing schematically showing a capping group included in a photo-alignment layer according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

The photo-alignment agent according to an exemplary embodiment may include at least one of a polyimide and a polyamic acid, and a capping group connected to a main chain end of at least one of the polyimide and the polyamic acid, wherein the capping group may include at least one of a first compound represented by following Chemical Formula 1 and a second compound represented by following Chemical Formula 2.

(Chemical Formula 1)

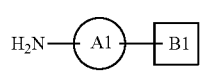

(Chemical Formula 2)

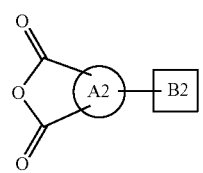

wherein A1 and A2 are, independently of each other, an aromatic compound having 4 to 20 carbon atoms or an aliphatic cyclic compound having 4 to 20 carbon atoms; and B1 and B2 are, independently of each other, a crosslinking reaction group containing an alkylene group ($-C_nH_{2n}-$, n is a natural number).

A crosslinking reaction group according to the present exemplary embodiment may include at least one of a third compound represented by following Chemical Formula 3, a fourth compound represented by following Chemical Formula 4, and a fifth compound represented by following Chemical Formula 5:

(Chemical Formula 3)

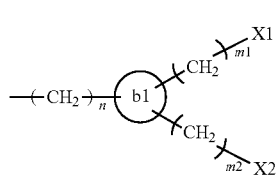

(Chemical Formula 4)

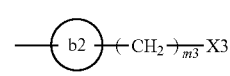

(Chemical Formula 5)

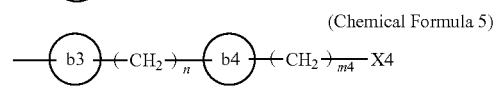

wherein n is a natural number of 3 to 11; m1 to m4 are, independently of each other, a natural number of 1 to 4; b1 is

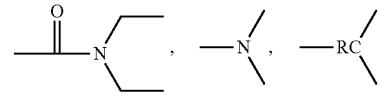

(wherein R is H or an alkyl group having 1 to 3 carbon atoms), an aromatic compound having 6 to 30 carbon atoms, or an aliphatic cyclic compound having 4 to 20 carbon atoms; and b2 to b4 are, independently of one another, a single bond, $-CH_2-$, $-COO-$, $-OCO-$, $-S-$, $-O-$, $-CH_2CH_2O-$, $-OCH_2CH_2-$, an aromatic compound having 6 to 30 carbon atoms, or an aliphatic cyclic compound having 4 to 20 carbon atoms. Herein, the aromatic compound may be, though not particularly limited to, phenyl, alkyl-substituted phenyl, fluorine-substituted phenyl, biphenyl, naphthanlene, anthracene, or pentacene, and the aliphatic cyclic compound may be, though not particularly limited to, cyclohexane, cyclobutane, or cyclopentane.

In Chemical Formulas 3 to 5, X1 to X4 includes, independently of one another, $-OH$, $-NH_2$, an acrylate group, a methacrylate group, a vinyl group or

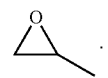

In the present exemplary embodiment, the crosslinking reaction group may include a compound represented by following Chemical Formula 3-1:

(Chemical Formula 3-1)

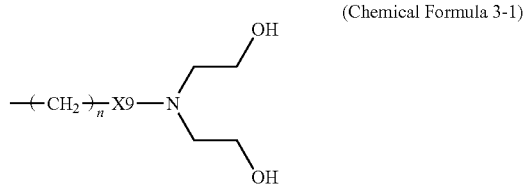

wherein n is a natural number of 3 to 11; X9 is —(CH$_2$)$_m$—O—, —O—(CH$_2$)$_m$—, —(CH$_2$)$_m$—S—, —S—(CH$_2$)$_m$— (wherein m is a natural number of 1 to 10),

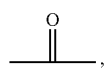

an aromatic compound having 6 to 30 carbon atoms, or an aliphatic cyclic compound having 4 to 20 carbon atoms.

As such, since the crosslinking reaction group according to the present exemplary embodiment may contain an alkylene group (—CH$_2$—) corresponding to a flexible group, and be included in the capping group to be connected to the main chain of the photo-alignment layer, the photo-alignment layer formed by using the photo-alignment agent including the crosslinking reaction group according to the present exemplary embodiment may improve a film hardness while minimizing afterimage deterioration.

In the present exemplary embodiment, the polyamic acid may contain a repeating unit of a sixth compound represented by following Chemical Formula 6, and the polyimide may contain a repeating unit of a seventh compound represented by following Chemical Formula 7:

(Chemical Formula 6)

(Chemical Formula 7)

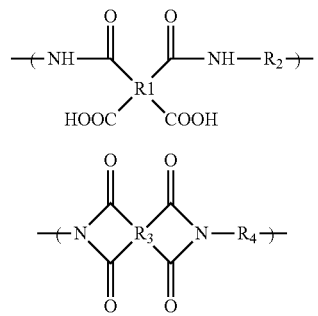

wherein R1 and R3 are, independently of each other, a tetravalent organic group derived from an aliphatic cyclic acid dianhydride or an aromatic acid dianhydride; and R2 and R4 are, independently of each other, a divalent organic group derived from aromatic diamine.

The polyimide or the polyamic acid may include a copolymer of (a) at least one of cyclobutanedianhydride (CBDA) and a cyclobutanedianhydride (CBDA) derivative, and (b) first diamine.

The cyclobutanedianhydride (CBDA) and the cyclobutanedianhydride (CBDA) derivative may contain a compound represented by following Chemical Formula 10:

(Chemical Formula 10)

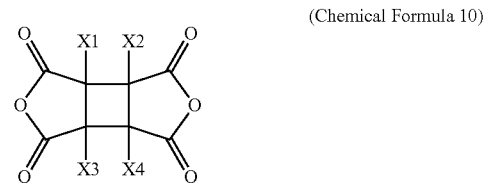

wherein X1 to X4 are, independently of one another, hydrogen, halogen, an unsubstituted or substituted alkyl group, an unsubstituted or substituted aryl group, or an unsubstituted or substituted heteroaryl group. Herein, if X1 to X4 are all hydrogen, the compound may be cyclobutanedianhydride.

In Chemical Formula 10, the cyclobutanedianhydride may contain a compound represented by following Chemical Formula 10-1, and the cyclobutanedianhydride derivative may contain a compound represented by following Chemical Formulas 10-2 or 10-3:

(Chemical Formula 10-1)

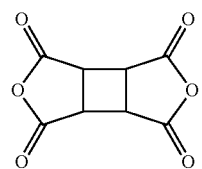

(Chemical Formula 10-2)

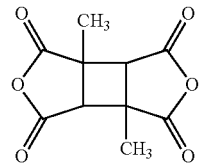

(Chemical Formula 10-3)

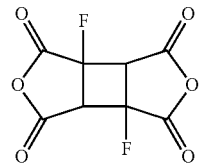

In the present exemplary embodiment, the first diamine may contain an alkylene group (—C$_k$H$_{2k}$—, k is a natural number). The first diamine may be a compound represented by following Chemical Formula 8:

(Chemical Formula 8)

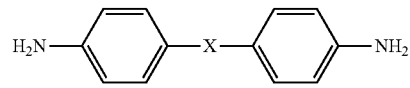

wherein X is —(CH$_2$)$_h$—, —S—(CH$_2$)$_h$—S—, —O—(CH$_2$)$_h$—O—,

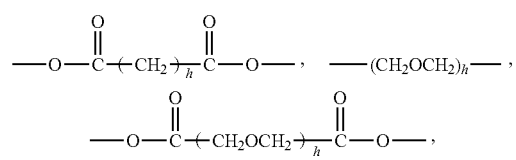

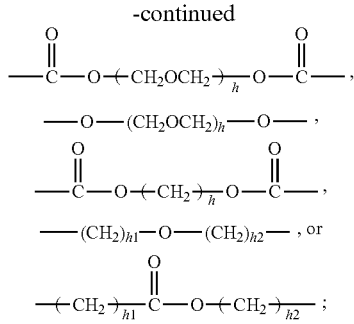

h is a natural number of 1 to 10; and h1 and h2 are, independently of each other, a natural number selected so that the sum of carbon atoms of an alkylene group of X is 2 to 10.

A photo-alignment agent according to the present exemplary embodiment may further contain a second diamine represented by following Chemical Formula 9:

(Chemical Formula 9)

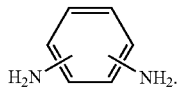

The second diamine is not limited to the compound represented by Chemical Formula 9, and may be a compound of Chemical Formula 9 wherein a hydrogen connected to a ring carbon is substituted with an alkyl group, halogen, sulfur, and the like, aromatic diamine such as p-phenylenediamine, m-phenylenediamine, 2,5-diaminotoluene, 2,6-diaminotoluene, 4,4'-diaminobiphenyl, 3,3'-dimethyl-4,4'-diaminobiphenyl, 3,3'-dimethoxy-4,4'-diaminobiphenyl, diaminodiphenylmethane, diaminodiphenylether, 2,2'-diaminodiphenylpropane, bis(3,5-diethyl4-aminophenyl)methane, diaminodiphenylsulfone, diaminobenzophenone, diaminonaphthalene, 1,4-bis (4-aminophenoxy)benzene, 1,4-bis(4-aminophenyl)benzene, 9,10-bis(4-aminophenyl)anthracene, 1,3-bis(4-aminophenoxy)benzene, 4,4'-bis(4-aminophenoxy)diphenylsulfone, 2,2-bis[4-(4-aminophenoxy)phenyl]propane, 2,2-bis(4-aminophenyl)hexafluoropropane, 2,2-bis[4-(4-aminophenoxy)phenyl]hexafluoropropane and the like, alicyclic diamine such as bis(4-aminocyclohexyl)methane, bis(4-amino-3-methylcyclohexyl)methane, and the like, and aliphatic diamine such as tetramethylenediamine, hexamethylenediamine and the like. However, the second diamine is not particularly limited thereto, and may include most kinds of diamines having an unflexural property, other than the first diamine.

In the present exemplary embodiment, the mole ratio between the first diamine and the second diamine may be 1:99 to 99:1, preferably about 20:80 to 50:50.

As such, since the first diamine according to the present exemplary embodiment contains an alkylene group ($-CH_2-$) corresponding to a flexible group, the photo-alignment layer formed by using the photo-alignment agent including a copolymer of the first diamine has a flexible property, and accordingly, has improved anisotropy to improve afterimage.

Hereinafter, an example of a method of manufacturing a photo-alignment agent according to the present exemplary embodiment is described.

Manufacturing Method of Photo-Alignment Agent

In a four-neck flask equipped with a stirrer, a temperature controller, a nitrogen gas injector, and a condenser, 0.5 mol of a compound represented by following Chemical Formula 8 was placed while passing nitrogen through, under a dark room condition, and N-methyl-2-pyrrolidone (NMP) was placed to prepare a mixed solution. In the mixed solution, 0.95 mol of a compound represented by following Chemical Formula 10 in a solid state was placed, and the mixture was stirred for about 1 hour. Then, 0.5 mol of a compound represented by following Chemical Formula 9 was injected to be reacted. At this time, the reaction was carried out for about 24 hours while maintaining the temperature at 30 to 60° C., thereby preparing a polyamic acid solution. The thus prepared polyamic acid solution was distilled to obtain a polyamic acid. The thus obtained polyamic acid had a weight average molecular weight of 3 to 50,000. To the polyamic acid, a mixed solvent of N-methyl-2-pyrrolidone (NMP) and 2-butyl cellosolve (volume ratio=about 7:2) was added, and the mixture was stirred at room temperature for 24 hours. To the mixture, about 5 to 7 wt % of a capping group represented by following Chemical Formula 2 was added to prepare a photo-alignment agent having a capping group connected to a main chain end of a polyamic acid.

(Chemical Formula 8)

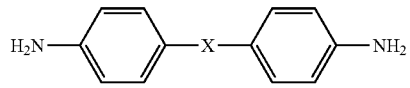

(Chemical Formula 9)

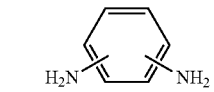

(Chemical Formula 10)

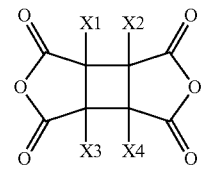

wherein X1 and X4 are a methyl group; and X2 and X3 are hydrogen, (Chemical Formula 2)

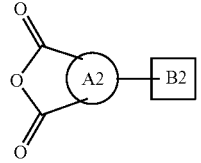

wherein A2 is an aromatic compound having 4 to 20 carbon atoms, or an aliphatic cyclic compound having 4 to 20 carbon atoms; and B1 and B2 are, independently of each other, a crosslinking reaction group containing an alkylene group ($-C_nH_{2n}-$, n is a natural number).

On the contrary, when 1 mol of acid dianhydride which is the compound represented by Chemical Formula 10 and 0.95 mol of the compound represented by Chemical Formulas 8 and 9 corresponding to diamine are reacted, the group having the main chain end derived from the acid dianhydride becomes increased. Accordingly, a capping group represented by following Chemical Formula 1 is added to prepare a photo-alignment agent having a capping group connected to a main chain end of a polyamic acid.

(Chemical Formula 1)

Method of Manufacturing Photo-Alignment Layer

The photo-alignment agent as described above was applied on an electrode, and the applied photo-alignment agent was baked. The baking process may proceed by two steps of prebaking and hard baking.

Thereafter, a photo-alignment layer may be formed by irradiating the photo-alignment agent with polarized light. Herein, the irradiated light may be ultraviolet rays having a range of 240 to 380 nanometers. Preferably, ultraviolet rays of 254 nanometers may be used. The polarized light may have energy of about 0.20 to about 1.0 J/cm$^2$, preferably about 0.40 to about 0.50 J/cm$^2$.

In order to increase alignment, the photo-alignment layer may be baked once more (hereinafter, referred to as a second baking process).

A polyimide included in the photo-alignment layer according to the present exemplary embodiment may contain a repeating unit of a seventh compound represented by following Chemical Formula 7:

(Chemical Formula 7)

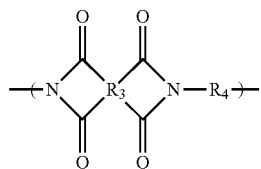

wherein R3 is a tetravalent organic group derived from an aliphatic cyclic acid dianhydride or an aromatic acid dianhydride; and R4 is a divalent organic group derived from aromatic diamine.

The photo-alignment layer according to the present exemplary embodiment may include polyimide and a capping group connected to a main chain end of the polyimide.

The capping group connected to a main chain end of the polyimide may be represented by following Structural Formulas 1 or 2:

(Structural Formula 1)

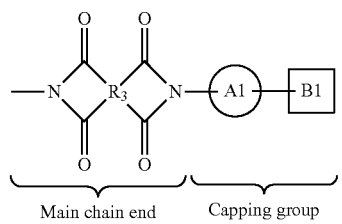

(Structural Formula 2)

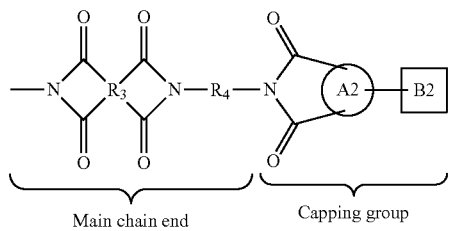

wherein R3 is a tetravalent organic group derived from an aliphatic cyclic acid dianhydride or an aromatic acid dianhydride; R4 is a divalent organic group derived from an aromatic diamine; A1 and A2 are, independently of each other, an aromatic compound having 4 to 20 carbon atoms, or an aliphatic cyclic compound having 4 to 20 carbon atoms; and B1 and B2 are, independently of each other, a crosslinking reaction group containing an alkylene group (—$C_nH_{2n}$—, n is a natural number).

The copolymer corresponding to the main chain in the photo-alignment layer according to an exemplary embodiment of the present disclosure may contain at least one of repeating units represented by following Chemical Formulas 11 and 12:

(Chemical Formula 11)

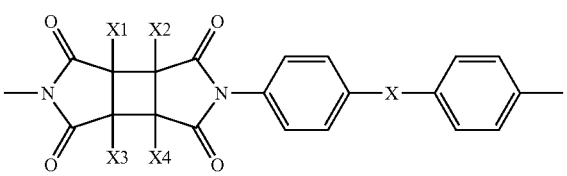

(Chemical Formula 12)

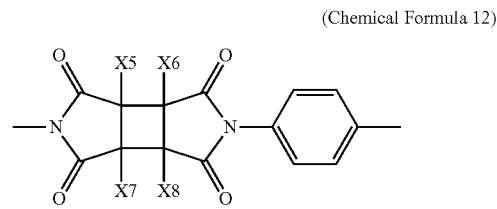

wherein X is —$(CH_2)_h$—, —S—$(CH_2)_h$—S—, —O—$(CH_2)_h$—O—,

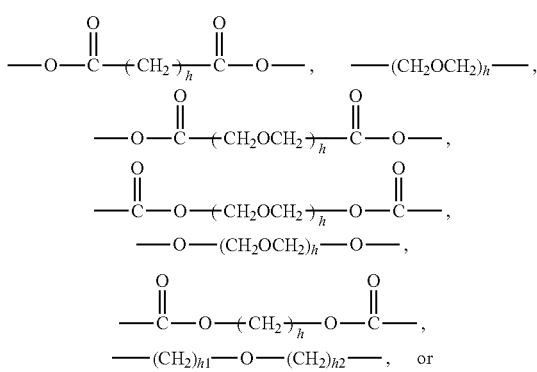

—$(CH_2)_{h1}$—O—$(CH_2)_{h2}$—, or

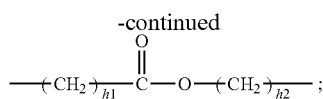

h is a natural number of 1 to 10; h1 and h2 are, independently of each other, a natural number selected so that the sum of carbon atoms of an alkylene group of X is 2 to 10; and X1 to X8 are, independently of one another, hydrogen, halogen, an unsubstituted or substituted alkyl group, an unsubstituted or substituted aryl group, or an unsubstituted or substituted heteroaryl group.

Preferably, the photo-alignment layer according to the present exemplary embodiment may include a copolymer represented by following Chemical Formula 13:

(Chemical Formula 13)

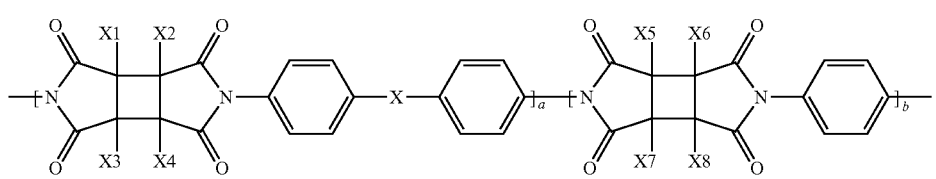

wherein X is —$(CH_2)_h$—, —S—$(CH_2)_h$—S—, —O—$(CH_2)_h$—O—,

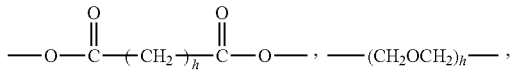
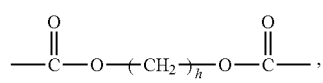
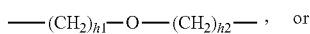, or
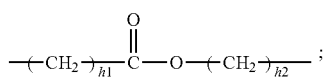;

h is a natural number of 1 to 10; h1 and h2 are, independently of each other, a natural number selected so that the sum of carbon atoms of an alkylene group of X is 2 to 10; a:b is 20:80 to 50:50; and X1 to X8 are, independently of each other, hydrogen, halogen, an unsubstituted or substituted alkyl group, an unsubstituted or substituted aryl group, or an unsubstituted or substituted heteroaryl group.

The capping group according to an exemplary embodiment of the present disclosure may be connected to a main chain end of the photo-alignment layer, as represented in following Structural Formula 1-1 or 2-1:

(Structural Formula 1-1)

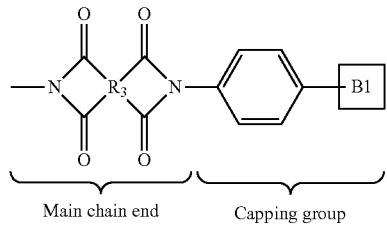

Main chain end    Capping group

-continued (Structural Formula 2-1)

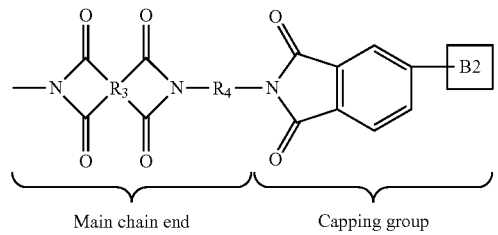

Main chain end    Capping group wherein R3 is a tetravalent organic group derived from an aliphatic cyclic acid dianhydride or an aromatic acid dianhydride; R4 is a divalent organic group derived from aromatic diamine; and B1 and B2 are, independently of each other, a crosslinking reaction group containing an alkylene group (—$C_nH_{2n}$—, n is a natural number).

Referring to FIG. 1, a crosslinking reaction group may be connected to a main chain end of a photo-alignment layer through a flexible group, and connected to a main chain of other neighboring photo-alignment layer. For example, if a group positioned at the end of the crosslinking reaction group is —OH, it undergoes an esterification reaction with —COOH of a polyamic acid, if a group positioned at the end of the crosslinking reaction group is —NH$_2$, it forms an amide bond with —COOH of polyamic acid, and if a group positioned at the end of the crosslinking reaction group is an acrylate or methacrylate group, a crosslinking reaction may occur by polymerization. Herein, a photo-alignment layer main chain may be formed by copolymerization of diamine and an acid dianhydride, and for example, a copolymer of at least one of acyclobutanedianhydride (CBDA) and a cyclobutanedianhydride (CBDA) derivative, and a diamine may be a main chain of the photo-alignment layer.

Figure 2:
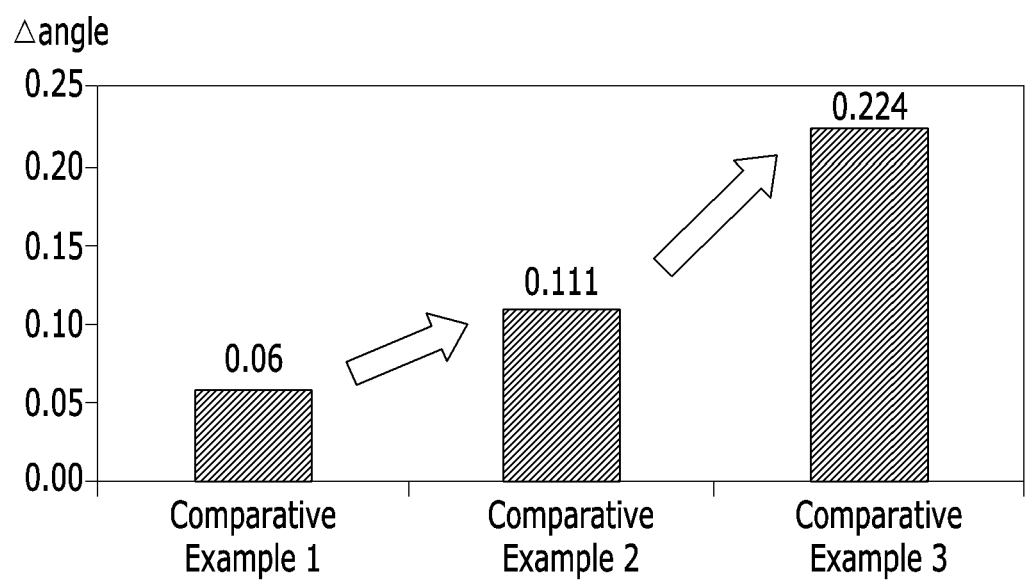
FIG. 2 is a graph showing an afterimage degree when adding a crosslinking agent having a rigid property.

In FIG. 2, Comparative Example 1 is a photo-alignment layer without the addition of a crosslinking agent to a photo-alignment agent including a copolymer of flexible diamine according to an exemplary embodiment of the present disclosure, Comparative Example 2 is a photo-alignment layer with the addition of 3 wt % of a rigid crosslinking agent represented by following Chemical Formula 4R to a photo-alignment agent including a copolymer of flexible diamine, and Comparative Example 3 is a photo-alignment layer with addition of 5 wt % of a rigid crosslinking agent represented by following Chemical Formula 4R to a photo-alignment agent including a copolymer of flexible diamine. In Comparative Examples 1 to 3 in common, $1^{st}$ baking proceeded at 210° C. for 30 minutes, and polarized light at 0.5 J/cm² was irradiated, and $2^{nd}$ baking proceeded at 210° C. for 30 minutes.

(Chemical Formula 4R)

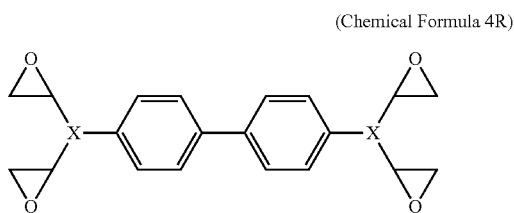

wherein X is

The angle indicated in Y-axis in FIG. 2 represents a degree to which a liquid crystal material does not return to an initial state at voltage off, and the larger the angle is, the more an afterimage may be deteriorated. Referring to FIG. 2, the more the rigid crosslinking agent is added, the worse the afterimage. Therefore, the rigid crosslinking agent is inappropriate for a crosslinking agent for improving film hardness in a photo-alignment layer formed by using flexible diamine.

Figure 3:
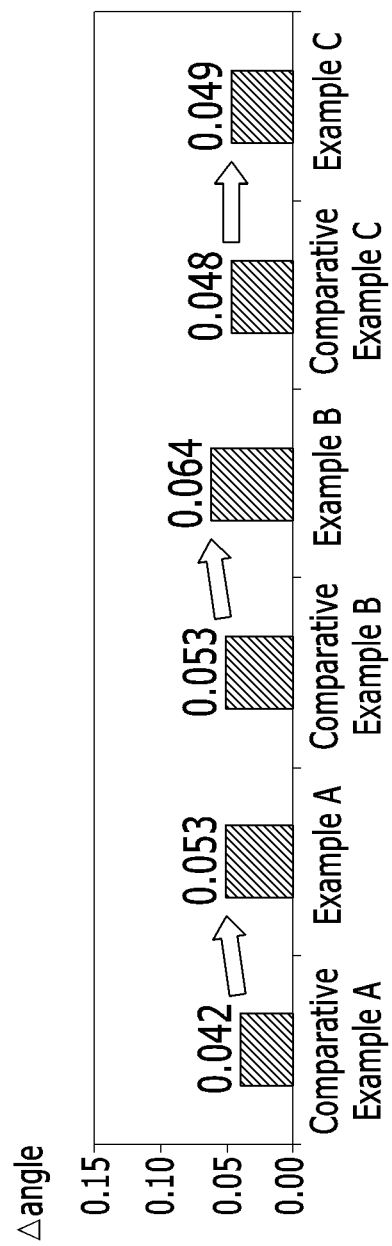
FIG. 3 is a graph showing an afterimage degree of a photo-alignment layer including a capping group having a flexible crosslinking reaction group according to an exemplary embodiment.

In FIG. 3, Comparative Examples A to C are photo-alignment layers without forming a capping group, and Examples A to C are photo-alignment layers with addition of a 3 wt % of capping group containing a flexible crosslinking reaction group. In both Comparative Example A and Example A, the $1^{st}$ baking proceeded at 230° C. for about 900 seconds, polarized light was irradiated at 0.5 J/cm², and the $2^{nd}$ baking proceeded at 210° C. for about 900 seconds. In both Comparative Example B and Example B, the $1^{st}$ baking proceeded at 230° C. for about 900 seconds, polarized light was irradiated at 0.5 J/cm², and the $2^{nd}$ baking proceeded at 230° C. for about 900 seconds. In both Comparative Example C and Example C, the $1^{st}$ baking proceeded at 240° C. for about 900 seconds, and polarized light was irradiated at 0.5 J/cm², and the $2^{nd}$ baking proceeded at 210° C. for about 900 seconds.

Referring to FIG. 3, the Examples including a flexible crosslinking reaction group in a capping group had a non-deteriorated afterimage, or a slight afterimage deterioration degree, as compared with Comparative Examples.

Hereinafter, a principle of improving film hardness and minimizing afterimage deterioration, in the case of connecting a flexible crosslinking reaction group according to the present exemplary embodiment to a main chain end will be described with reference to FIGS. 4 to 6.

Figure 4:
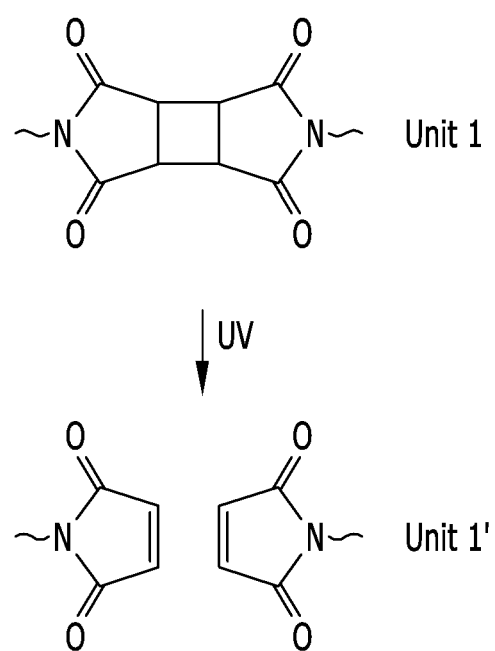
FIG. 4 is a structural formula showing that polyimide is decomposed in a photo-alignment layer according to an exemplary embodiment.

Referring to FIG. 4, cyclobutanedianhydride (CBDA) and diamine are copolymerized to form a polyamic acid, and then polyimide (Unit 1) is formed through a baking process, and the polyimide is irradiated with UV to form maleimide (Unit 1').

Figure 5:
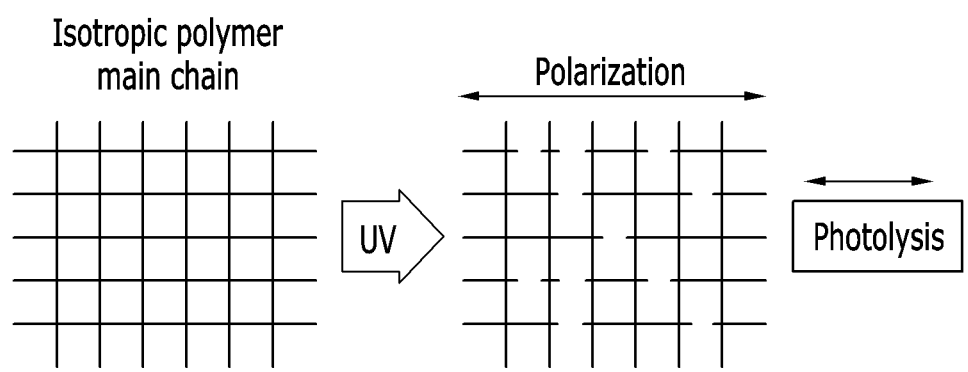
FIG. 5 is a drawing showing a process of changing from isotropic to anisotropic in a photo-alignment layer according to an exemplary embodiment of the present disclosure.

FIG. 5 shows that a polymer main chain including the polyimide (Unit 1) as shown in FIG. 4 is decomposed by UV irradiation to be aligned. Referring to FIG. 5, when an isotropic polymer main chain is irradiated with polarized UV, photolysis occurs in a polarization direction (absorption axis direction) to align photo-alignment layer in a vertical direction to polarization. Herein, if exposure amount is too small, photolysis rate is low so that alignment may be deteriorated. On the contrary, if the exposure amount is too large, the photolysis rate is high so that photolysis occurs not only in a polarization direction, but also in other direction, alignment may be deteriorated.

Figure 6:
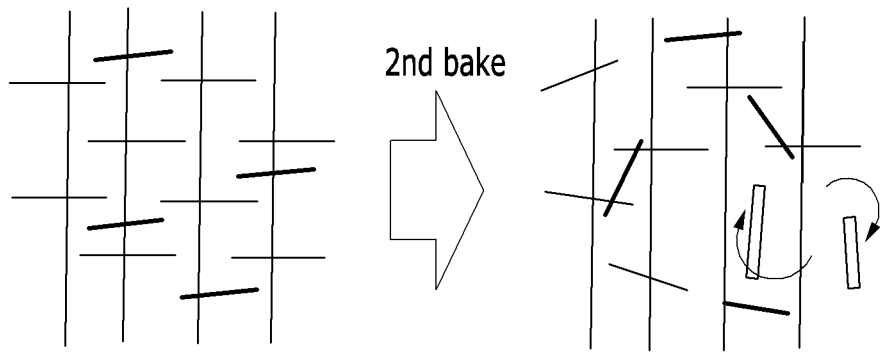
FIG. 6 is a drawing showing a principle of improving afterimage in a photo-alignment layer formed using a photo-alignment agent to which a flexible crosslinking agent is added according to an exemplary embodiment.
Figure 6:
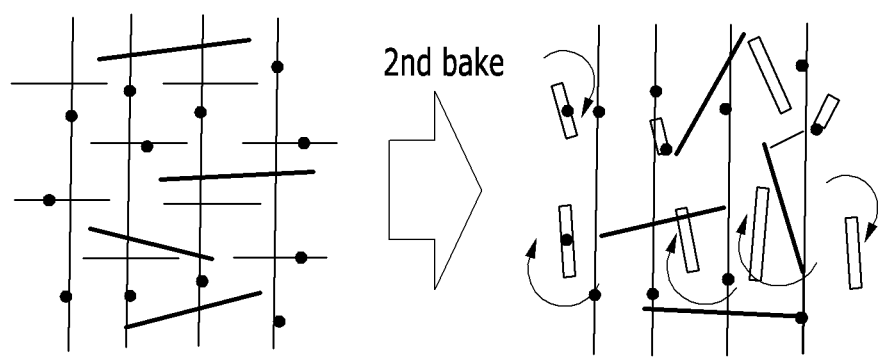

Referring to FIG. 6, when a second baking process proceeds on a photo-alignment layer including a rigid crosslinking agent, the rigid crosslinking agent interrupts the rearrangement of photolysis molecules so that there is not a large afterimage improvement effect. However, when a second baking process proceeds on a photo-alignment layer including a flexible crosslinking reaction group, a larger rearrangement of photolysis molecules results as well as an increase to the afterimage improvement effect. A second baking process may be a process of baking a photo-alignment layer once more, in order to increase alignment. Further, a crosslinkable, uniform composition may be secured by connecting a flexible crosslinking reaction group to a main chain end of a photo-alignment layer after polymerization in a polyamic acid or polyimide alignment layer synthesis process.

Hereinafter, a liquid crystal display including the photo-alignment layer according to an exemplary embodiment of the present disclosure as described above will be described.

Figure 7:
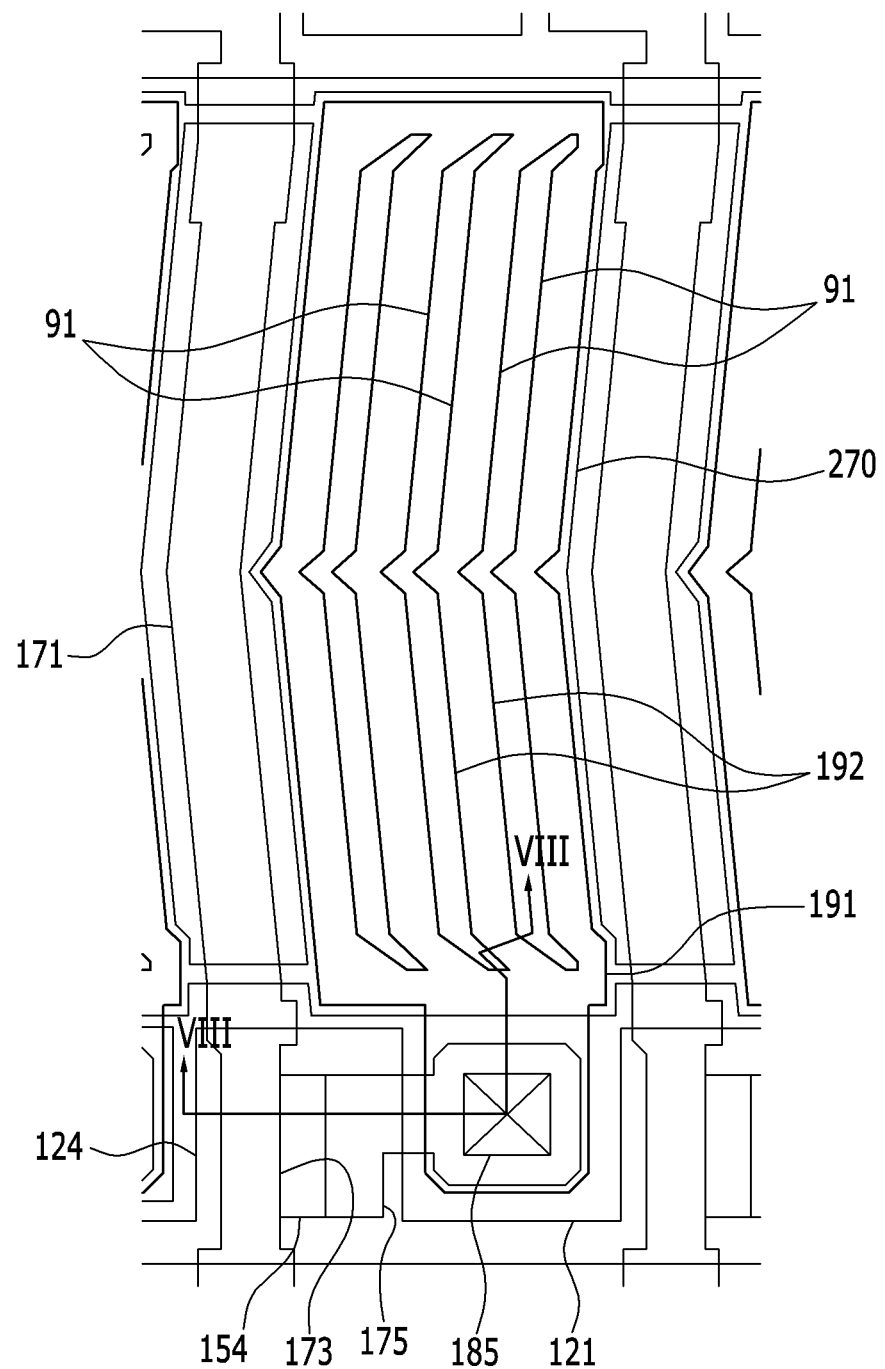
FIG. 7 is a top plan view showing a liquid crystal display according to an exemplary embodiment.
Figure 8:
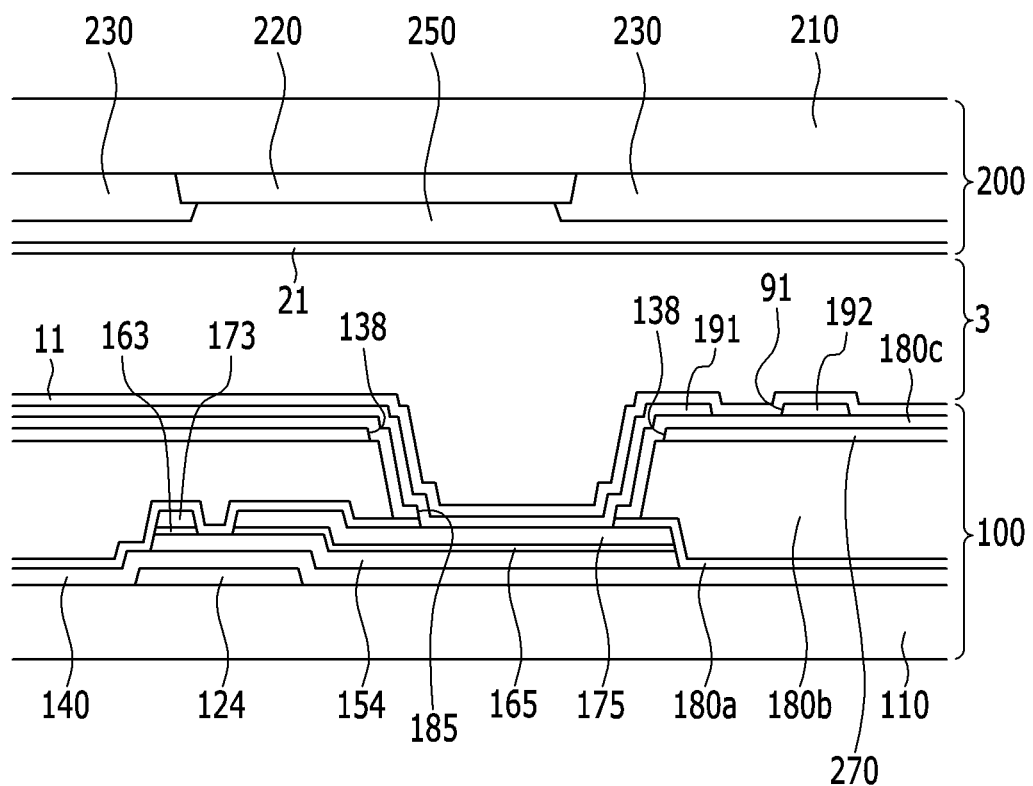
FIG. 8 is a cross-sectional view taken along the line VIII-VIII of FIG. 7.

Referring to FIGS. 7 and 8, a liquid crystal display according to the present exemplary embodiment includes a lower panel 100 and an upper panel 200 facing to each other, and a liquid crystal layer 3 interposed therebetween.

First, lower panel 100 is described.

A gate conductor including gate line 121 is formed on a first substrate 110 consisting of a transparent glass or plastic.

Gate line 121 may include a large end (not shown) for connection to a gate electrode 124 and another layer or an external driving circuit.

Gate line 121 may be made of an aluminum (Al)-based metal such as aluminum or an aluminum alloy, a silver (Ag)-based metal such as silver or a silver alloy, a copper (Cu)-based metal such as copper or a copper alloy, a molybdenum (Mo)-based metal such as molybdenum or a molybdenum alloy, chromium (Cr), tantalum (Ta), titanium (Ti), and the like. However, gate line 121 may have a multilayer structure including at least two conductive layers having different physical properties.

On gate line 121, gate insulating layer 140, consisting of silicon nitride (SiNx), silicon oxide (SiOx), or the like, is formed. Gate insulating layer 140 may have a multilayer structure including at least two insulating layers having different physical properties.

Semiconductor layer 154, made of amorphous silicon, polysilicon, or the like, is disposed on gate insulating layer 140. Semiconductor layer 154 may be formed of oxide semiconductor.

Ohmic contacts 163 and 165 are formed on semiconductor layer 154. Ohmic contacts 163 and 165 may be made of a material such as n+ hydrogenated amorphous silicon or the like in which n-type impurity such as phosphorus or the like is doped in a high concentration, or made of silicide. Ohmic contacts 163 and 165 may be paired to be disposed on semiconductor layer 154. If semiconductor layer 154 is an oxide semiconductor, ohmic contacts 163 and 165 may be omitted.

Data line 171 including source electrode 173 and a data conductor including drain electrode 175 are formed on ohmic contacts 163 and 165 and gate insulating layer 140.

Data line 171 includes a large end (not shown) for connection to another layer or an external driving circuit. Data line 171 transfers a data signal, and is stretched mainly in a vertical direction to intersect with gate line 121.

Herein, data line 171 may have a flexure portion having a curved shape in order to obtain maximum light transmittance of a liquid crystal display, and the flexure portions may meet in a middle region of a pixel area to form a V-shape.

Source electrode 173 may be a portion of data line 171, and disposed on the same line as data line 171. Drain electrode 175 is formed to be stretched in parallel with source electrode 173. Therefore, drain electrode 175 is in parallel with part of data line 171.

Gate electrode 124, source electrode 173, and drain electrode 175 form one thin film transistor (TFT) with semiconductor layer 154, and a channel of the thin film transistor is formed on semiconductor layer 154 between source electrode 173 and drain electrode 175.

The liquid crystal display, according to an exemplary embodiment, includes source electrode 173 disposed on the same line of data line 171, and drain electrode 175 stretched in parallel with data line 171, thereby broadening the width of the thin film transistor without widening the area occupied by a data conductor, and thus, increasing the aperture ratio of the liquid crystal display.

Data line 171 and drain electrode 175 is preferably made of a refractory metal such as molybdenum, chromium, tantalum, and titanium, or an alloy thereof, and may have a multilayer structure including a refractory metal layer (not shown), and low resistance conductive layer (not shown). Examples of the multilayer structure include a double layer of a chromium or molybdenum (alloy) lower layer and an aluminum (alloy) upper layer, and a triple layer of a molybdenum (alloy) lower layer, an aluminum (alloy) intermediate layer, and molybdenum (alloy) upper layer.

First passivation layer 180a is disposed on the exposed portion of data conductors 171, 173, and 175, gate insulating layer 140, and semiconductor 154. First passivation layer 180a may consist of an organic insulating material, an inorganic insulating material, or the like.

Second passivation layer 180b is formed on first passivation layer 180a. second passivation layer 180b may consist of an organic insulator.

Second passivation layer 180b may be a color filter. If second passivation layer 180b is a color filter, then second passivation layer 180b may inherently display one of the primary colors. Examples of a primary color include colors such as red, green, blue, yellow, cyan, magenta, or the like. Though not shown herein, a color filter displaying a mixed color of the primary colors, or white, in addition to the primary colors, may be further included as the color filter. If second passivation layer 180b is a color filter, color filter 230 may be omitted from upper panel 200 as described below. Differently from the present exemplary embodiment, second passivation layer 180b may be formed of an organic insulating material, and a color filter (not shown) may be formed between the first passivation layer 180a and second passivation layer 180b.

Common electrode 270 may be disposed on second passivation layer 180b. Common electrode 270, having a planar shape, may be formed on a front surface of substrate 110 as one plate, and have opening 138 disposed in a region corresponding to the surrounding of drain electrode 175. That is, common electrode 270 may have a plate shape.

Common electrodes 270 disposed in adjacent pixels are connected to each other and may receive a certain level of common voltage conveyed from the outside of a display area.

Insulating layer 180c is disposed on common electrode 270. Insulating layer 180c may consist of an organic insulating material, an inorganic insulating material, or the like.

Pixel electrode 191 is disposed on insulating layer 180c. Pixel electrode 191 includes a curved edge almost in parallel with the flexure portion of data line 171. Pixel electrode 191 has a plurality of cutouts 91, and includes a plurality of branch electrodes 192 disposed between neighboring cutouts 91.

Pixel electrode 191 is a first field generating electrode or a first electrode and common electrode 270 is a second field generating electrode or a second electrode. Pixel electrode 191 and common electrode 270 may form a fringe field, and the like.

First contact hole 185 is formed to expose a drain electrode 175 on first passivation layer 180a, second passivation layer 180b, and insulating layer 180c. Pixel electrode 191 is physically and electrically connected to drain electrode 175 through contact hole 185 so that voltage is applied to the pixel electrode from drain electrode 175.

First alignment layer 11 is formed on pixel electrode 191 and insulating layer 180c. First alignment layer 11 includes a photo-alignment layer.

In the present exemplary embodiment, first alignment layer 11 includes the photo-alignment layer.

Herein, a method of forming the alignment layer will be described.

The photo-alignment agent according to an exemplary embodiment is applied on pixel electrode 191 and baked. The baking step may be carried out by two steps: a prebaking step and a hard baking step. In the hard baking step, polyamic acid, included in the photo-alignment agent, may be changed into polyimide and a flexible crosslinking reaction group, connected to a polyimide main chain end, may be esterified at 150 to 200° C. for connecting to a neighboring polyimide. Thereafter, the photo-alignment agent may be irradiated with polarized light to form photolyzed first alignment layer 11. Herein, the irradiated light may be ultraviolet rays ranging from 240 nm to 380 nm. Preferably, ultraviolet rays at 254 nm may be used. The polarized light may have energy of about 0.20 J/cm$^2$ to about 1.0 J/cm$^2$, preferably of about 0.40 J/cm$^2$ to about 0.50 J/cm$^2$.

In order to increase alignment, the photo-alignment layer may be baked once more (hereinafter, referred to as a second baking process). Herein, photolyzed molecules may be rearranged to increase anisotropy.

Upper panel 200 will be described.

Color filter 230 may be disposed between second substrate 210 and overcoat 250. If second passivation layer 180b of lower panel 100 is a color filter, or a color filter is formed on lower panel 100, color filter 230 may be omitted in upper panel 200. Further, light blocking member 220 on upper panel 200 may be also formed on lower panel 100.

Light blocking member 220 may be disposed between second substrate 210 and overcoat 250. An edge portion of light blocking member 220 may overlap color filter 230.

Overcoat 250 is disposed between light blocking member 220 and second alignment layer 21, between color filter 230 and second alignment layer 21. Overcoat 250 may be made of an (organic) insulating material, prevent color filter 230 from being exposed, and provide a flat surface. Overcoat 250 may also be omitted.

Second alignment layer 21 may be disposed between overcoat 250 and liquid crystal layer 3. Second alignment layer 21 may be formed by the same material and in the same method as the first alignment layer 11, described above.

In the present exemplary embodiment, liquid crystal layer 3 may include a liquid crystal having negative dielectric anisotropy or positive dielectric anisotropy.

The liquid crystal of liquid crystal layer 3 may be arranged so that the major axis direction of the liquid crystal is in parallel with display panels 100 and 200.

Pixel electrode 191 receives data voltage from drain electrode 175 and common voltage 270 receives a certain level of common voltage from a common voltage applying part disposed outside of the display area.

Pixel electrode 191 and common electrode 270, which are field generating electrodes, generate an electric field so that the liquid crystal of liquid crystal layer 3 disposed on the field generating electrodes 191 and 270 may rotate in a direction vertical or parallel to the electric field. Depending on the rotation direction of the liquid crystal molecule, as determined above, the polarization of light passing through the liquid crystal layer is changed.

As such, by forming field generating electrodes 191 and 270 on display panel 100, the transmittance of a liquid crystal display is raised, and a wide viewing angle may be realized.

According to the liquid crystal display according to the exemplary embodiment as illustrated, common electrode 270 has a planar shape, and pixel electrode 191 has a plurality of branch electrodes, however, according to the liquid crystal display according to another exemplary embodiment of the present disclosure, pixel electrode 191 may have a planar shape, and common electrode 270 may have a plurality of branch electrodes.

The present disclosure may apply to all other cases where two field generating electrodes are overlapped, with an insulating layer interposed therebetween, on first substrate 110, and a first field generating electrode formed under the insulating layer has a planar shape, and a second field generating electrode formed on the insulating layer has a plurality of branch electrodes.

According to an exemplary embodiment, a photo-alignment layer and a liquid crystal display having optimized afterimage and film hardness may be implemented by forming a photo-alignment layer using diamine containing a flexible group and a crosslinking reaction group containing a flexible group.

According to an exemplary embodiment of the present disclosure, crosslinking density may be controlled by connecting a crosslinking reaction group containing a flexible group to an alignment layer main chain.

As above, the preferred exemplary embodiments of the present disclosure have been described in detail, but the scope of the present disclosure is not limited thereto, and various modifications by a person skilled in the art using a basic concept of the present disclosure as defined in the claims below, also belong to the scope of the present disclosure.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A photo-alignment layer, comprising:
   a polyimide, and
   a capping group connected to a main chain end of the polyimide,
   wherein the capping group comprises at least one of:
      a first group represented by the following Chemical Formula 1; and
      a second group represented by the following Chemical Formula 2:

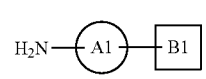

(Chemical Formula 1)

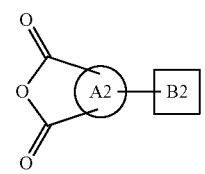

(Chemical Formula 2)

wherein A1 and A2 are, independently of each other, an aromatic group having 4 to 20 carbon atoms or an aliphatic cyclic group having 4 to 20 carbon atoms; and B1 and B2 are, independently of each other, a crosslinking reaction group, wherein the crosslinking reaction group in the Chemical Formulas 1 and 2 comprises at least one of:
   a third group represented by the following Chemical Formula 3;
   a fourth group represented by the following Chemical Formula 4; and
   a fifth group represented by the following Chemical Formula 5:

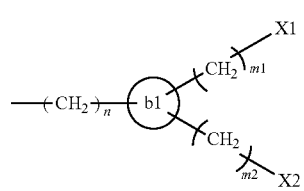

(Chemical Formula 3)

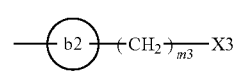

(Chemical Formula 4)

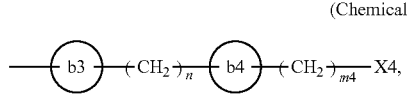

(Chemical Formula 5)

and wherein n is a natural number of 3 to 11; m1 to m4 are, independently of each other, a natural number of 1 to 4; b1 is

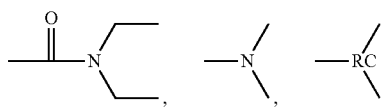

(wherein R is H or an alkyl group having 1 to 3 carbon atoms), an aromatic group having 6 to 30 carbon atoms, or an aliphatic cyclic group having 4 to 20 carbon atoms; b2 to b4 are, independently of one another, a single bond, —$CH_2$—, —COO—, —OCO—, —S—, —O—, —$CH_2CH_2O$—, —$OCH_2CH_2$—, an aromatic group having 6 to 30carbon atoms, or an aliphatic cyclic group having 4 to 20 carbon atoms; and X1 to X4, independently of one another, include —OH, —$NH_2$, an acrylate group, a methacrylate group, a vinyl group or

2. A photo-alignment layer comprising:
a polyimide, and
a capping group connected to a main chain end of the polyimide,
wherein the capping group comprises at least one of:
   a first group represented by the following Chemical Formula 1; and
   a second group represented by the following Chemical Formula 2:

(Chemical Formula 1)

(Chemical Formula 2)

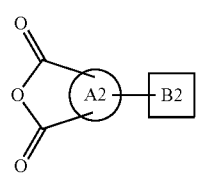

wherein A1 and A2 are, independently of each other, an aromatic group having 4 to 20carbon atoms or an aliphatic cyclic group having 4 to 20 carbon atoms; and B1 and B2 are, independently of each other, a crosslinking reaction group,
wherein the crosslinking reaction group in the Chemical Formulas 1 and 2 comprises a third group represented by the following Chemical Formula 3-1:

(Chemical Formula 3-1)

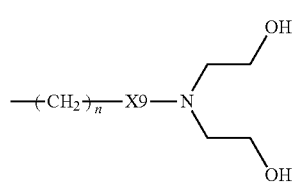

and
wherein n is a natural number of 3 to 11; X9 is —$(CH_2)_m$—O—, —O—$(CH_2)_m$—, —$(CH_2)_m$—S—, —S—$(CH_2)_m$— (wherein m is a natural number of 1 to 10)

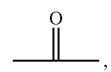

an aromatic group having 6 to 30 carbon atoms, or an aliphatic cyclic group having 4 to 20 carbon atoms.

3. The photo-alignment layer of claim 1, wherein:
the polyimide contains a repeating unit of a seventh group represented by the following Chemical Formula 7:

(Chemical Formula 7)

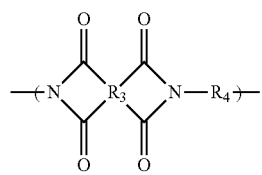

wherein R3 is a tetravalent organic group derived from an aliphatic cyclic acid dianhydride or an aromatic acid dianhydride; and R4 is a divalent organic group derived from aromatic diamine.

4. The photo-alignment layer of claim 3, wherein:
the capping group connected to a main chain end of the polyimide is represented by the following Structural Formulas 1 or 2:

(Structural Formula 1)

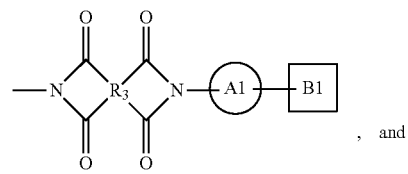

, and (Structural Formula 2)

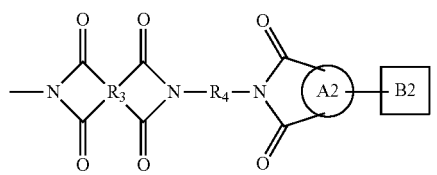

5. The photo-alignment layer of claim 3, wherein:
the polyimide is a copolymer of (a) at least one of a cyclobutanedianhydride (CBDA) and a cyclobutanedianhydride (CBDA) derivative, and (b) a first diamine.

6. The photo-alignment layer of claim 5, wherein:
the first diamine comprises an compound represented by the following Chemical Formula 8:

(Chemical Formula 8)

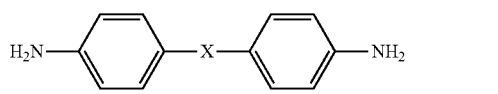

wherein X is —$(CH_2)_h$—, —S—$(CH_2)_h$—S—, —O—$(CH_2)_h$—O—,

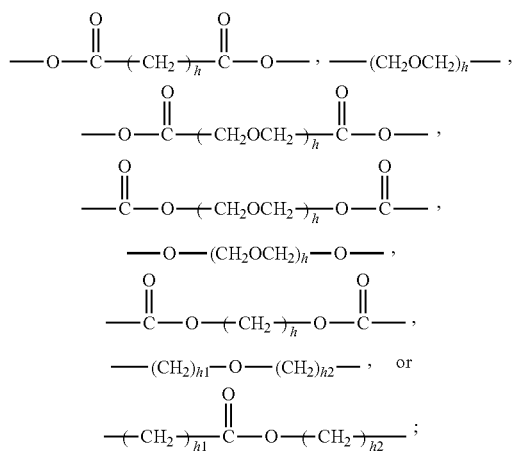

h is a natural number of 1 to 10; and h1 and h2 are, independently of each other, a natural number selected so that the sum of carbon atoms of an alkylene group of X is 2 to 10.

7. The photo-alignment layer of claim 6, wherein:
the copolymer further comprises a polymer of (a) at least one of a cyclobutanedianhydride (CBDA) and a cyclobutanedianhydride (CBDA) derivative, and (b) a second diamine.

8. The photo-alignment layer of claim 7, wherein:
the copolymer contains at least one of a repeating unit represented by the following Chemical Formulas 11 and 12:

(Chemical Formula 11)

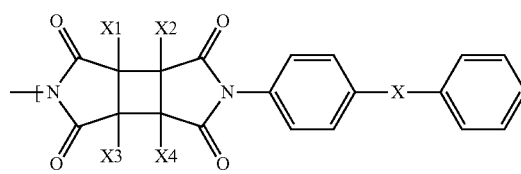

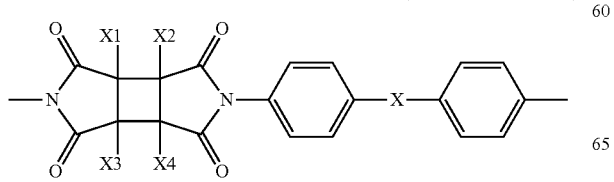

-continued (Chemical Formula 12)

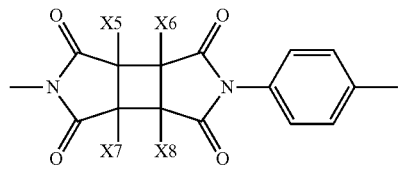

wherein X is —$(CH_2)_h$—, —S—$(CH_2)_h$—S—, —O—$(CH_2)_h$—O—,

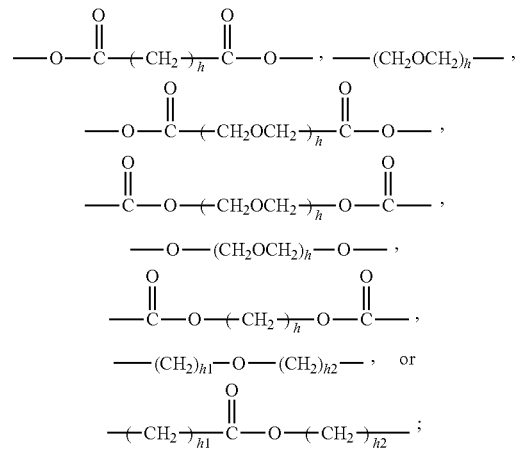

h is a natural number of 1 to 10; h1 and h2 are, independently of each other, a natural number selected so that the sum of carbon atoms of an alkylene group of X is 2 to 10; and X1 to X8 are, independently of one another, hydrogen, halogen, an unsubstituted or substituted alkyl group, an unsubstituted or substituted aryl group, or an unsubstituted or substituted heteroaryl group.

9. The photo-alignment layer of claim 7, wherein:
the copolymer comprises a structural unit represented by the following Chemical Formula 13:

(Chemical Formula 13)

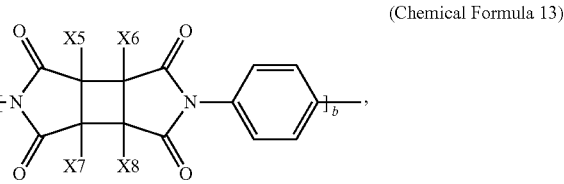

wherein X is —$(CH_2)_h$—, —S—$(CH_2)_h$—S—, —O—$(CH_2)_h$—O—,

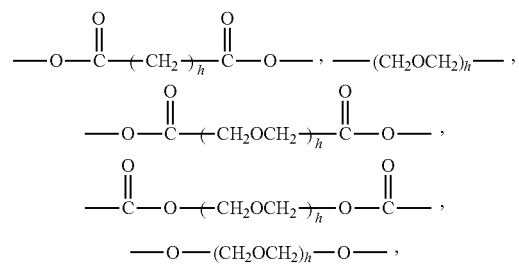

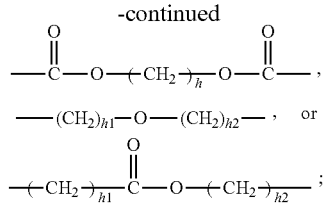,

——(CH$_2$)$_{h1}$—O——(CH$_2$)$_{h2}$——, or

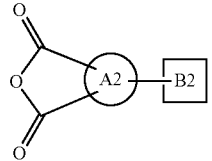;

h is a natural number of 1 to 10; h1 and h2 are, independently of each other, a natural number selected so that the sum of carbon atoms of an alkylene group of X is 2 to 10; a:b is 20:80 to 50:50; and X1to X8 are, independently of each other, hydrogen, halogen, an unsubstituted or substituted alkyl group, an unsubstituted or substituted aryl group, or an unsubstituted or substituted heteroaryl group.

10. A liquid crystal display, comprising:
a first substrate,
a thin film transistor disposed on the first substrate,
a first electrode connected to the thin film transistor, and
a first alignment layer disposed on the first electrode,
wherein the first alignment layer comprises polyimide and
  a capping group connected to a main chain end of the polyimide,
the capping group comprises at least one of:
  a first group represented by the following Chemical Formula 1; and
  a second group represented by the following Chemical Formula 2:

(Chemical Formula 1)

H$_2$N—(A1)—[B1]

(Chemical Formula 2)

wherein A1 and A2 are, independently of each other, an aromatic group having 4 to 20 carbon atoms or an aliphatic cyclic group having 4 to 20 carbon atoms; and B1 and B2 are, independently of each other, a crosslinking reaction group,
wherein the crosslinking reaction group in the Chemical Formulas 1 and 2 comprises at least one of:
  a third group represented by the following Chemical Formula 3;
  a fourth group represented by the following Chemical Formula 4;and
  a fifth group represented by the following Chemical Formula 5:

(Chemical Formula 3)

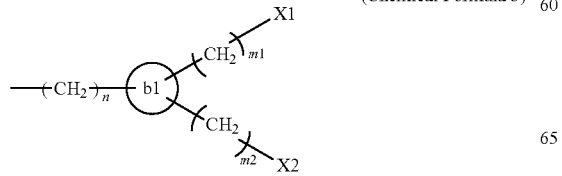

(Chemical Formula 4)

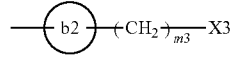

(Chemical Formula 5)

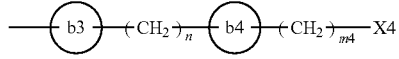

wherein n is a natural number of 3 to 11; m1 to m4 are, independently of each other, a natural number of 1 to 4; b1 is

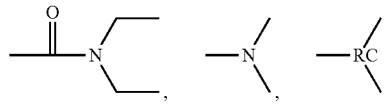

(wherein R is H or an alkyl group having 1 to 3 carbon atoms), an aromatic group having 6 to 30 carbon atoms, or an aliphatic cyclic group having 4 to 20 carbon atoms; b2 to b4 are, independently of one another, a single bond, —CH$_2$—, —COO—, —OCO—, —S—, —O—, —CH$_2$CH$_2$O—, —OCH$_2$CH$_2$—, an aromatic group having 6 to 30carbon atoms, or an aliphatic cyclic group having 4 to 20 carbon atoms; and X1 to X4, independently of one another, include —OH, —NH$_2$, an acrylate group, a methacrylate group, a Vinyl group or

.

11. A liquid crystal display, comprising:
a first substrate,
a thin film transistor disposed on the first substrate,
a first electrode connected to the thin film transistor, and
a first alignment layer disposed on the first electrode,
wherein the first alignment layer comprises polyimide and
  a capping group connected to a main chain end of the polyimide,
the capping group comprises at least one of:
  a first group represented by the following Chemical Formula 1: and
  a second group represented by the following Chemical Formula 2:

(Chemical Formula 1)

(Chemical Formula 2)

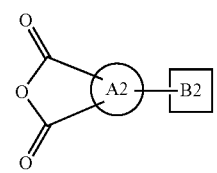

wherein A1 and A2 are, independently of each other, an aromatic group having 4 to 20carbon atoms or an aliphatic cyclic group having 4 to 20 carbon atoms; and B1 and B2 are, independently of each other, a crosslinking reaction group, wherein the crosslinking reaction group in the Chemical Formulas 1 and 2 comprises a third group represented by the following Chemical Formula 3-1:

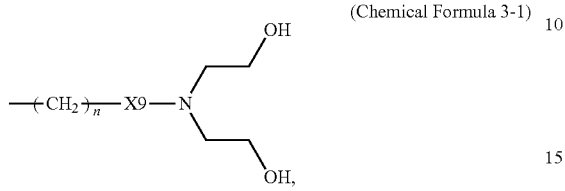

(Chemical Formula 3-1)

and wherein n is a natural number of 3 to 11; X9 is —(CH$_2$)$_m$—O—, —O—(CH$_2$)$_m$—S—, —S—(CH$_2$)$_m$- (wherein m is a natural number of 1 to 10),

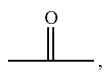

an aromatic group having 6 to 30 carbon atoms, or an aliphatic cyclic group having 4 to 20 carbon atoms.

12. The liquid crystal display of claim 10 wherein:

the polyimide comprises a repeating unit of a seventh group represented by the following Chemical Formula 7:

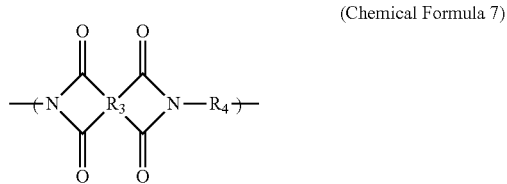

(Chemical Formula 7)

wherein R3 is a tetravalent organic group derived from an aliphatic cyclic acid dianhydride or an aromatic acid dianhydride; and R4 is a divalent organic group derived from aromatic diamine.

13. The liquid crystal display of claim 12, wherein:

the capping group connected to a main chain end of the polyimide is represented by the following Structural Formulas 1 or 2:

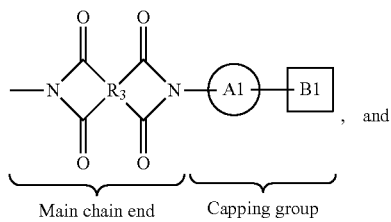

(Structural Formula 1)

, and

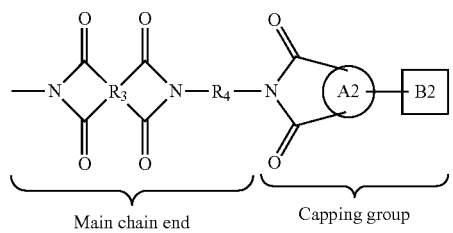

(Structural Formula 2)

14. The liquid crystal display of claim 13, wherein:

the polyimide is a copolymer of (a) at least one of a cyclobutanedianhydride (CBDA) and a cyclobutanedianhydride (CBDA) derivative, and (b) a first diamine.

15. The liquid crystal display of claim 14, wherein:

the first diamine comprises a compound represented by the following Chemical Formula 8:

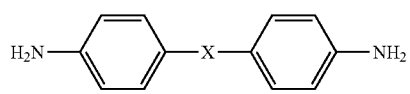

(Chemical Formula 8)

wherein X is —(CH$_2$)$_h$—, —S—(CH$_2$)$_h$—S—, —O—(CH$_2$)$_h$—O—,

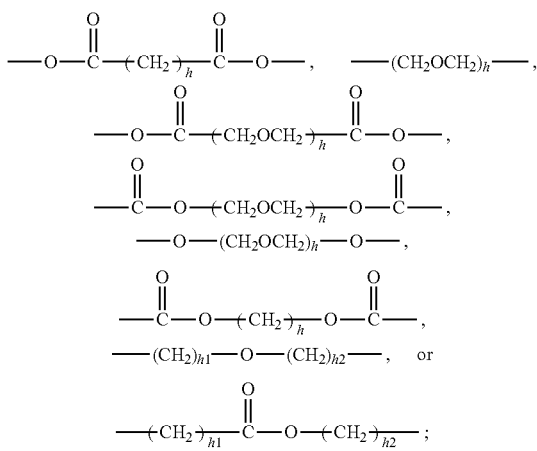

h is a natural number of 1 to 10; and h1 and h2 are, independently of each other, a natural number selected so that the sum of carbon atoms of an alkylene group of X is 2 to 10.

16. The liquid crystal display of claim 15, wherein:

the copolymer further comprises a polymer of (a) at least of a cyclobutanedianhydride (CBDA) and a cyclobutanedianhydride (CBDA) derivative, and (b) a second diamine.

17. The liquid crystal display of claim 16, wherein:

the copolymer contains at least one of repeating units represented by the following Chemical Formulas 11 and 12:

(Chemical Formula 11)

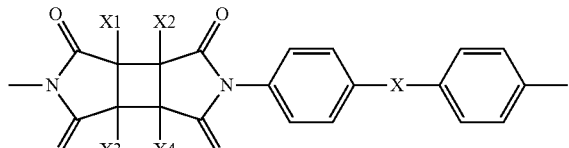

(Chemical Formula 12)

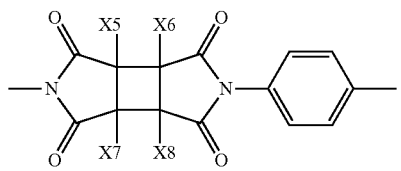

wherein X is —(CH$_2$)$_h$—, —S—(CH$_2$)$_h$—S—, —O—(CH$_2$)$_h$—O—,

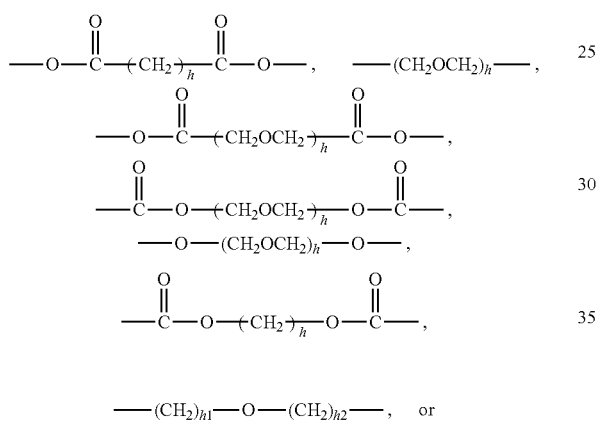

h is a natural number of 1 to 10; h1 and h2 are, independently of each other, a natural number selected so that the sum of carbon atoms of an alkylene group of X is 2 to 10; and X1 to X8 are, independently of one another, hydrogen, halogen, an unsubstituted or substituted alkyl group, an unsubstituted or substituted aryl group, or an unsubstituted or substituted heteroaryl group.

18. The liquid crystal display of claim 16, wherein:
the copolymer comprises a structural unit represented by the following Chemical Formula 13:

wherein X is —(CH$_2$)$_h$—, —S—(CH$_2$)$_h$—S—, —O—(CH$_2$)$_h$—O—,

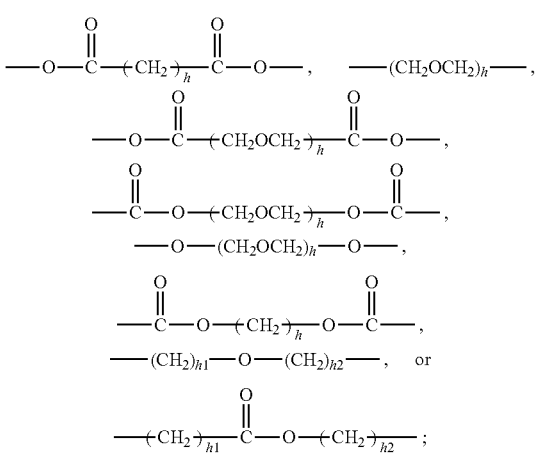

h is a natural number of 1 to 10; h1 and h2 are, independently of each other, a natural number selected so that the sum of carbon atoms of an alkylene group of X is 2 to 10; a:b is 20:80 to 50:50; and X1 to X8 are, independently of each other, hydrogen, halogen, an unsubstituted or substituted alkyl group, an unsubstituted or substituted aryl group, or an unsubstituted or substituted heteroaryl group.

19. The liquid crystal display of claim 10, further comprising:
a second electrode disposed on the first substrate, wherein an insulating layer is disposed between the first electrode and the second electrode.

20. The liquid crystal display of claim 19, wherein:
the first electrode comprises a plurality of branch electrodes, and the second electrode has a plate shape.

21. The liquid crystal display of claim 20, wherein:
the plurality of branch electrodes overlap the second electrode having a plate shape.

22. The liquid crystal display of claim 19, further comprising:
a passivation layer disposed between the thin film transistor and the second electrode, wherein the thin film transistor and the first electrode are connected to each other by a contact hole through the passivation layer and the insulating layer.

23. The liquid crystal display of claim 19, further comprising:
a second substrate facing the first substrate,
a second alignment layer disposed on the second substrate, and (Chemical Formula 13)

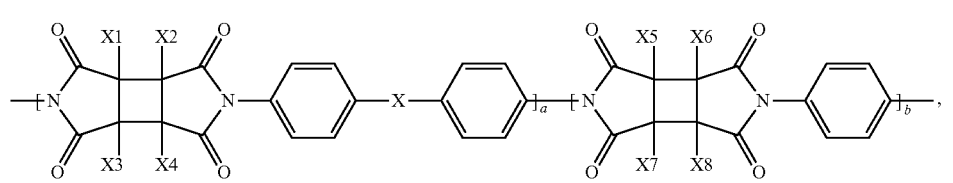

a liquid crystal layer disposed between the first substrate and the second substrate, and containing a liquid crystal molecule, wherein the second alignment layer is formed of the same material as the first alignment layer.

\* \* \* \* \*